United States Patent
Hirota et al.

(10) Patent No.: US 6,567,484 B1
(45) Date of Patent: May 20, 2003

(54) BURST SYNCHRONIZING CIRCUIT

(75) Inventors: Masaki Hirota, Kawasaki (JP); Michio Kusayanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/357,352

(22) Filed: Jul. 14, 1999

(30) Foreign Application Priority Data

Jul. 15, 1998  (JP) ............................................ 10-200032

(51) Int. Cl.[7] ................................................. H04L 7/00
(52) U.S. Cl. ........................ 375/355; 375/368; 370/518; 327/152
(58) Field of Search ................................. 375/316, 326, 375/328, 340, 342, 354, 355, 362, 364, 365, 366, 367, 368; 370/503, 509, 510, 511, 512, 513, 514, 518, 520; 327/141, 144, 152, 153, 161, 162, 163; 348/500, 525, 526, 536, 337

(56) References Cited

U.S. PATENT DOCUMENTS

| | | | | |
|---|---|---|---|---|
| 3,978,285 A | * | 8/1976 | Tan et al. ................... | 375/373 |
| 4,794,626 A | * | 12/1988 | Tanabe et al. .............. | 375/368 |
| 5,255,292 A | * | 10/1993 | LaRosa et al. .............. | 375/368 |
| 6,038,264 A | * | 3/2000 | Uesugi ....................... | 375/316 |

FOREIGN PATENT DOCUMENTS

JP         09083500 A  *  3/1997  ............. H04L/7/00

* cited by examiner

*Primary Examiner*—Stephen Chin
*Assistant Examiner*—Chieh M. Fan
(74) *Attorney, Agent, or Firm*—Katten Muchin Zavis Rosenman

(57) ABSTRACT

A burst synchronizing circuit synchronizes a received data signal in a burst fashion and sampling phases with which the received data signal is sampled. A first part samples a data pattern with different sampling phases. A second part selects the received data signal sampled with an optimal sampling phase based on sampling phases with which the data pattern is detected.

11 Claims, 24 Drawing Sheets

BURST SYNCHRONIZING CIRCUIT

BACKGROUND OF THE INVENTION

1. Field of the Invention

The present invention relates to a burst synchronizing circuit which synchronizes a received data signal in a burst fashion and a sampling phase of the received data signal with each other. More particularly, the present invention is concerned with a burst synchronizing circuit used in an optical subscriber transmission system, in which the received data signal is sampled by a sampling clock synchronized with a stable range of the bit position of the received data signal at the time of receiving the data signal transmitted in the burst fashion as a continuous signal.

2. Description of the Related Art

FIG. 1 is a diagram of an optical subscriber transmission system, which is an example of a system in which a data signal arranged in the burst fashion is transmitted. The optical subscriber transmission system shown in FIG. 1 includes a master station 20-1 and a plurality of slave stations 20-2 (#1–#n), which are coupled with the master station 20-1 via optical fibers 20-3 and an optical coupler 20-4. The slave stations 20-2 correspond to subscribers.

The master station 20-1 continuously transmits a data signal addressed to the slave stations 20-2 (#1–#n) in a down transmission direction. The data signal transmitted in the down transmission direction branches at the optical coupler 20-4, and is transmitted to the slave stations 20-2 (#1–#n) in the broadcasting style. Each of the slave stations 20-2 (#1–#n) discriminates the respective address signal included the data signal transmitted in the down transmission direction, and acquires only the data signal addressed to its own station.

The slave stations 20-2 (#1–#n) transmit data signals to the master station 20-1 in an up transmission direction at respective timings in the burst fashion in order to prevent the data signals from colliding with each other. In this case, the data signal is continuously transmitted in the down transmission direction. Hence, each of the slave stations 20-2 (#1–#n) can perform a retiming operation on the received data signal by using a PLL (Phase-Locked Loop) circuit or the like.

In contrast, the data signals are transmitted in the up transmission direction in the burst fashion. The optical fibers 20-3 become longer as the slave stations 20-2(#1–#n) are located a longer distance away from the master station 20-1. Hence, the master station 20-1 receives the burst signals transmitted by the slave stations 20-2 (#1–#n) at different bit positions and different optical signal levels.

Hence, each time the burst data signal is received, the master station 20-1 is required to select, during a short time, the optimal sampling phase for latching the burst data signal with an appropriate bit phase by using a preamble signal added to the leading end of the burst data signal and to perform the retiming operation on the burst data signal.

FIG. 2 is a block diagram of a burst signal receiving part of the master station 20-1. As shown, the optical burst signal received through the optical fiber 20-3 is converted into an electric signal by an optical module 21-1. The electric signal is then subjected, by a burst synchronizing circuit 21-2, to the retiming operation for latching the data bits of the electric signal with the optimal phase as described above.

Generally, the burst data signal includes a delimiter pattern added to the leading end of the burst data signal in addition to the preamble signal. The delimiter pattern which a data pattern for frame synchronization for identifying the phase of the whole burst signal. A delimiter synchronizing circuit 21-3 performs a delimiter synchronization using a delimiter pattern signal. A data processing part 21-4 processes the received data on the basis of the data signal obtained after the delimiter synchronization.

FIG. 3 is a diagram of a waveform of the output signal of the optical module 21-1 (which is the input signal of the burst synchronizing circuit 21-2). The output signal of the optical module 21-1 has a pulse width which varies due to deterioration of the performance of a built-in optical amplifier and/or deterioration of the S/N ratio. More particularly, A pulse width (a one-bit cycle) T of one time slot has edge-indeterminate areas $\tau$ in the rising and falling edges thereof, as illustrated by dotted areas. The remaining section of the pulse except the edge-indeterminate areas $\tau$ is the valid pulse width within which the sampling can duly be performed. A parameter of how much variations in the pulse width can be tolerated is one of the indexes describing the performance of the burst synchronizing circuit.

FIG. 4 is a block diagram of the conventional burst synchronizing circuit 21-2. An input data signal obtained by converting an optical signal transmitted over an optical fiber into an electric signal is sampled with a plurality of different phases with the period of one bit by a data sampling part 23-1. Thus, the data sampling part 23-1 sequentially outputs pieces of sampled data of the input data signal having mutually different phases.

An edge detecting part 23-2 compares the pieces of sampled data having the neighboring phases with each other, and detects a sampling phase which causes a change of data (the rising or falling edge of the data bit waveform). Based on the detection result obtained by the edge detecting part 23-2, a select signal generating part 23-3 generates a select signal used to select the sampled data obtained by sampling with the optimal phase, and outputs the select signal to a selector 23-4. Then, the selector 23-4 selects the sampled data obtained by sampling with the optimal phase in accordance with the select signal, and outputs it to the next stage.

There are a variety of means, provided in the data sampling part 23-1, for sampling the input data signal with a plurality of different phases with the one-bit period and sequentially outputting pieces of sampled data having the mutually different phases. For example, the input data signal is sequentially delayed at intervals shorter than the one-bit period, and delayed signals are sampled by a system clock (which is a clock having the one-bit period of the input data signal). By way of another example, the input data signal is sampled by a clock faster than the above-mentioned system clock. By way of yet another example, the system clock is sequentially delayed at intervals shorter than the one-bit period, so that multiple phase clocks are generated. Then, the input data signal is sampled by the multiple phase clocks.

There are a variety of means, provided in the edge detecting part 23-2, for detecting the sampling phase which causes a change of data. For example, there is a single-side edge detecting method in which either the rising edge or the falling edge of the signal is detected from the pieces of sampled data having the mutually different phases by means of an edge pattern decoder. There is also a both-side edge detecting method in which both the rising and falling edges of the signal are detected. By way of yet another example, the positions of the edges are detected over a plurality of bit positions and are then averaged, so that the average position can be detected. This method is called a multiple-point edge detecting method.

The single-side edge detecting method detects the phase of the one-side edge of a bit in the input data signal. The above bit is a bit changed from "0" to "1", namely, from a low level to a high level, or a bit changed from "1" to "0", namely, from the high level to the low level. Then, the sampled data obtained by sampling using the sampling clock after a given timing passing over the section of the related edge-indeterminate area is selected from the phase position of the detected edge.

The both-side edge detecting method detects the phases of the both-sides of a bit in the input data signal. The above bit is a bit which alternately changes to "0" and "1", that is, the low and high levels every bit. Then, the sampled data obtained by sampling using the sampling clock located in an intermediate position between the detected edges of the two sides.

FIG. 5 is a diagram of an operation in which the sampled data having the optimal phase is selected by the both-side edge detecting method. More particularly, FIG. 5 illustrates that a data signal 24-1 having values "0", "1" and "0" is sequentially input and is sampled by sampling clocks (#1–#14) indicated by ↑. As shown in FIG. 5, sample values "0" are obtained by sampling clocks #1–#3, and sampled values "1" are obtained by sampling clocks #4–#10. Further, sampled values "0" are obtained by sampling clocks #11–#14. Then, it is checked whether the adjacent sampled clocks coincide with each other. Hence, it is possible to detect the edges located between sampling clocks #3 and #4 and between sampling clocks #10 and #11. Then, sampled data is selected by sampling clock #7 having the phase located at the center of the section between the above edges.

The above-mentioned burst synchronizing circuit is described in detail in Japanese Unexamined Patent Application No. 9-83500.

The means for selecting sampled data having the optimal phase by the single-side edge detecting method is not required to transmit a unique data pattern for edge detection. However, the sampling clock located at the fixed timing after the one-side edge of the pulse is always selected. Hence, the sampling clock thus selected does not consider a variation in the phase of the other-side edge of the pulse. Hence, the single-side detection tolerates only a small pulse-width variation.

The means for selecting sampled data having the optimal phase by the both-side edge detecting method selects the sampling phase taken into consideration variations in the phases of the both-side edges of the pulse, and thus tolerates a large pulse-width variation, as compared to the single-side edge detecting method. However, it is necessary to transmit a data signal having a pattern of "010" or "101" in order to detect the both-side edges of the pulse.

In the normal burst transmission, the preamble added to the leading end of the burst signal is arranged to have an alternating pattern of "0" and "1". The phases of the both-side edges are detected by using the pattern data arranged in the preamble. If a bit error occurs in the alternating pattern, it is no longer possible to detect the both-side edges of one bit but detect the both-side edges over a plurality of bits. Hence, the sampled data having the optimal phase cannot be selected.

The single-side and both-side edge detecting methods select sampled data having the optimal phase by only the one-time edge detection. Hence, there is a possibility that sampled data having an inappropriate phase may be selected in a case where a pulse-width variation over the tolerable level occurs in the input data signal due to deterioration of the S/N ratio.

In contrast, the multiple-point edge detecting method detects the edges of a plurality of bits of the input data signal and has a capability of reducing the influence of bit error. Hence, the multiple-point edge detecting method tolerates a large pulse-width variation, as compared to the single-side and both-side edge detecting methods. However, the multiple-point edge detecting method requires a plurality of data bits to be acquired and thus a longer time necessary to select the sampled data having the optimal phase.

SUMMARY OF THE INVENTION

An object of the present invention is to provide a burst synchronizing circuit in which the above disadvantages are eliminated.

A more specific object of the present invention is to provide a burst synchronizing circuit having a tolerance for pulse-width variation as large as the both-side edge detecting method without any bit-basis alternating pattern for burst synchronization and having a capability such that sample data having the optimal phase can be selected for a short time even if a bit error occurs.

The above objects of the present invention are achieved by a burst synchronizing circuit which synchronizes a received data signal in a burst fashion and sampling phases with which the received data signal is sampled, said burst synchronizing circuit comprising: a first part which samples a data pattern with different sampling phases; and a second part which selects the received data signal sampled with an optimal sampling phase based on sampling phases with which the pattern data is detected.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The burst data signal includes, as has been described previously, the delimiter pattern signal which is the data pattern for frame synchronization used to identify the whole frame of the burst signal. Further, like data in the HEC (Header Error Control) in an ATM (Asynchronous Transfer Mode) cell header, the burst data signal may have a predetermined data pattern signal obtained by an operation on the already transmitted data signal.

The burst synchronizing circuit of the present invention samples a predetermined data pattern signal as described above by a plurality of different sampling phases and selects sampled data having the optimal phase on the basis of the sampling phase with which the predetermined data pattern is detected.

Figure 6:
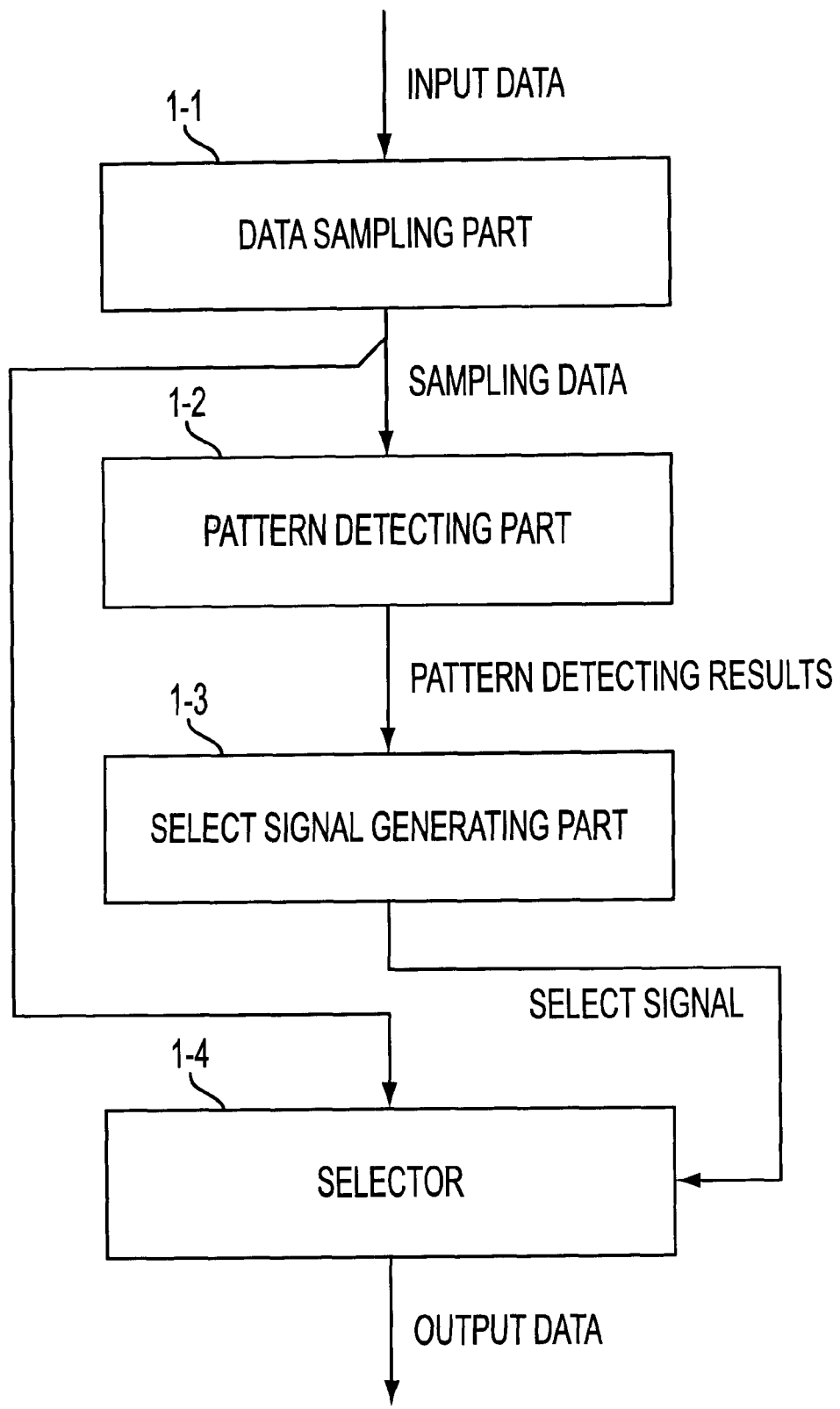
FIG. 6 is a block diagram of a basic structure of a burst synchronizing circuit of the present invention.

FIG. 6 is a diagram of a basic structure of a burst synchronizing circuit according to an embodiment of the present invention. Referring to FIG. 6, there are illustrated a data sampling part 1-1, a pattern detecting part 1-2, a select signal generating part 1-3, and a selector 1-4.

As in the case of the data sampling part of the conventional burst synchronizing circuit, the data sampling part 1-1 samples the input data signal with a plurality of sampling phases having phase differences finer than the one-bit width by using a high-speed clock, a multi-phase clock or a delay element. Then, the data sampling part 1-1 outputs sampled data to the pattern detecting part 1-2 and the selector 1-4.

The pattern detecting part 1-2 detects, from the sampled data values obtained by sampling with the different phases, sampled data which coincides with a predetermined pattern, and outputs a pattern detection result to the select signal generating part 1-3.

The select signal generating part 1-3 generates a select signal for selecting the sampled data obtained by sampling with the optimal phase from the pattern detection result from the pattern detecting part 1-2, and outputs the select signal to the selector 1-4.

The selector 1-4 selects the sampled data which is sampled with the optimal phase from among the pieces of sampled data having the different phases output from the data sampling part 1-1 in accordance with the select signal from the select signal generating part 1-3.

A description will now be given, with reference to FIGS. 7 through 13, of the principle of the operation of the burst synchronizing circuit of the present invention. In the following description, 7 preamble bits PR1–PR7 and 9 delimiter bits DL1–DL9 are added to the burst signal, which is followed by payload data PL1, PL2, PL3, . . . The pattern signal detected by the burst synchronizing circuit is the delimiter pattern.

Figure 7:
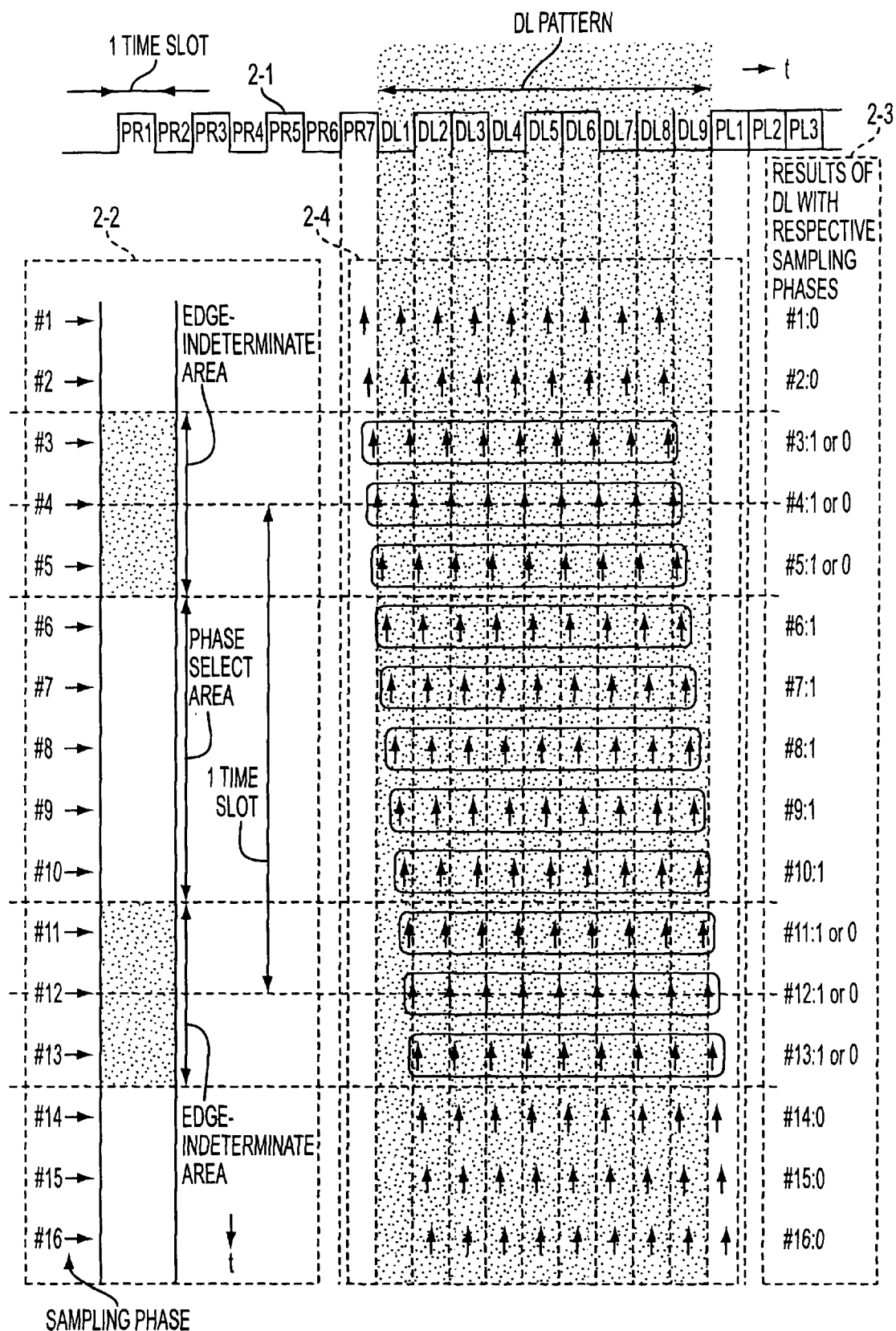
FIG. 7 is a diagram showing a relationship among a burst data signal, sampling phases and results of detecting a delimiter pattern.
Figure 8:
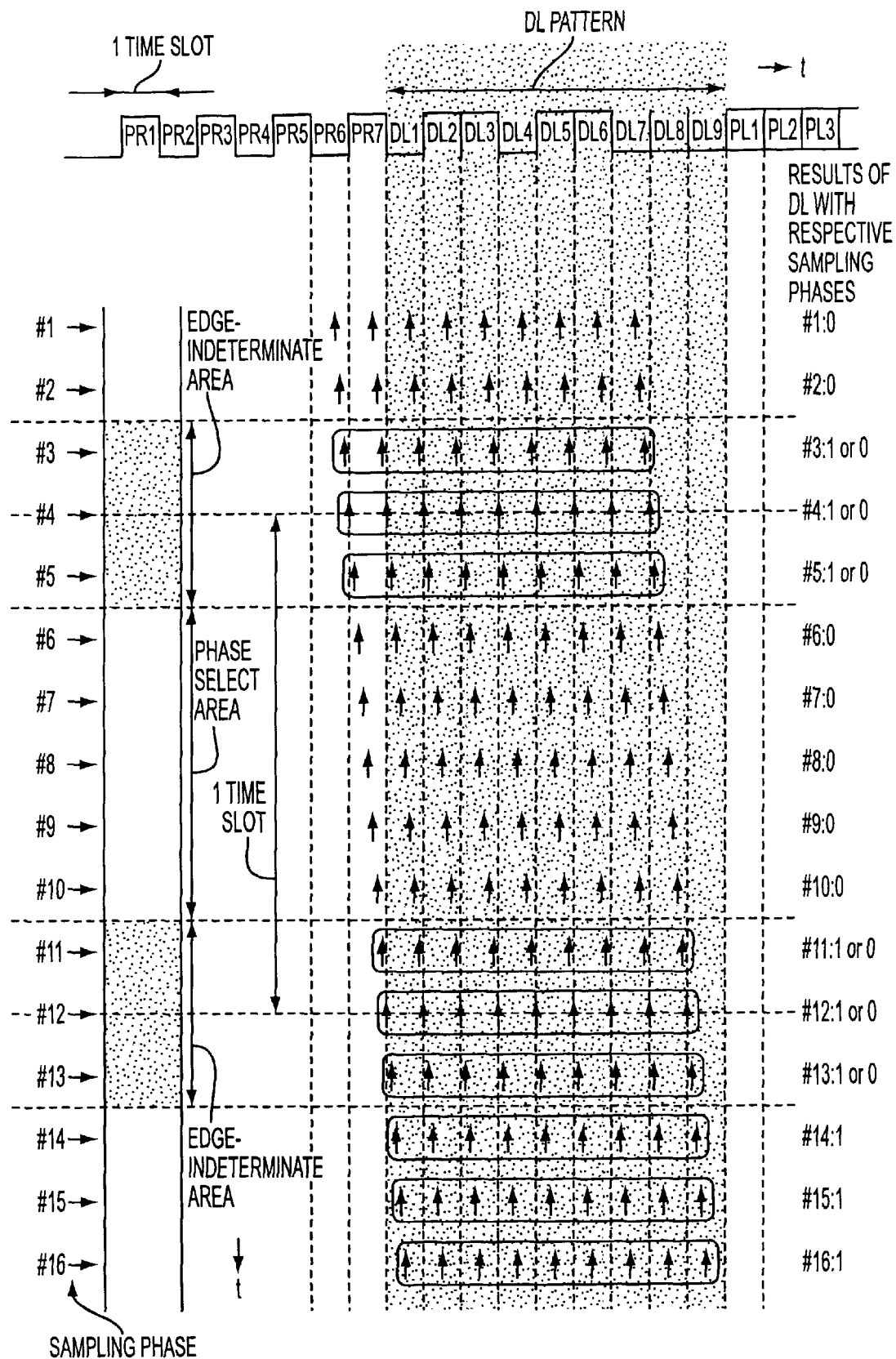
FIG. 8 is a diagram showing a relationship among a burst data signal, sampling phases and results of detecting a delimiter pattern.
Figure 9:
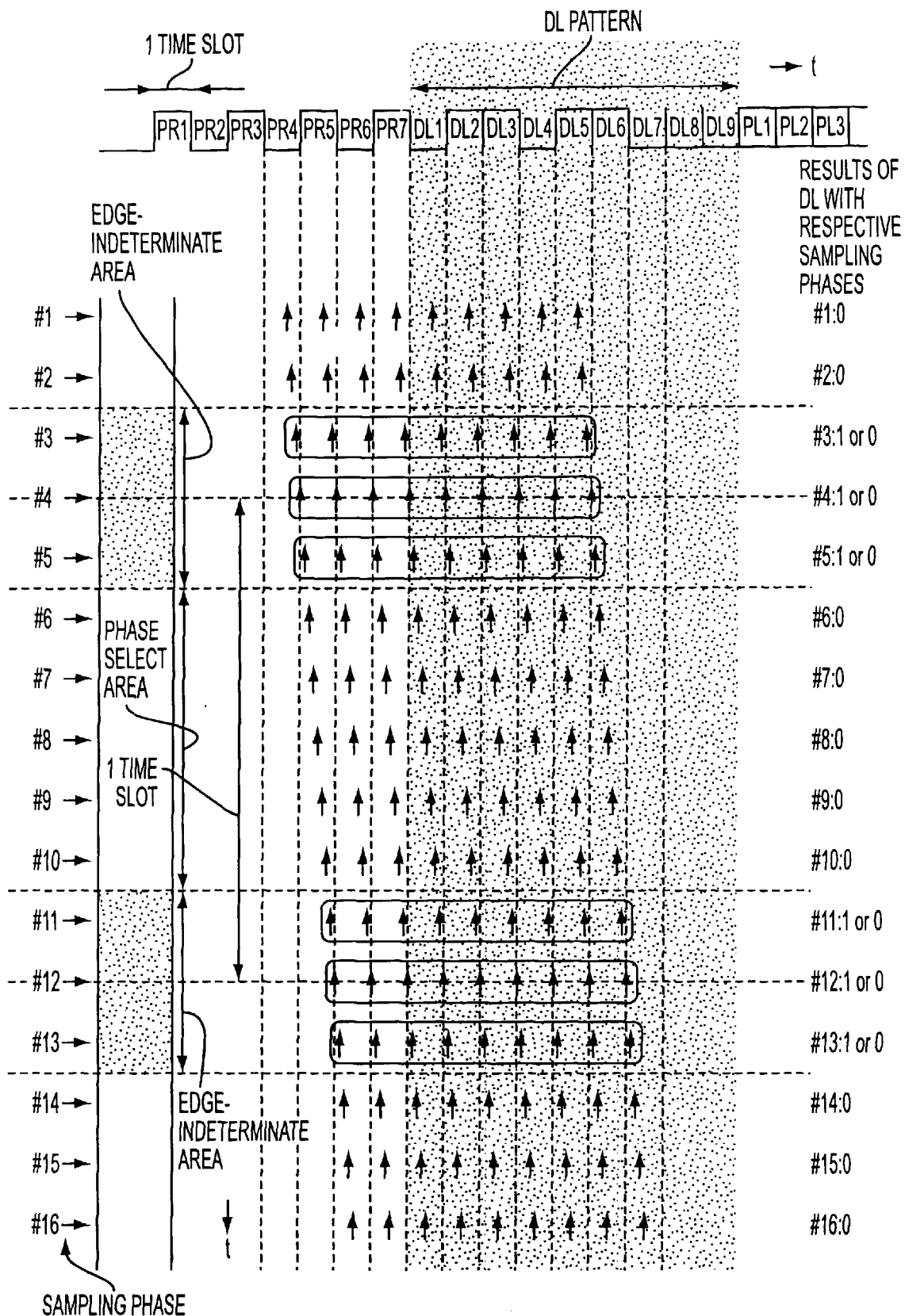
FIG. 9 is a diagram showing a relationship among a burst data signal, sampling phases and results of detecting a delimiter pattern.

FIGS. 7 through 9 show relationships among the burst data signal, the sampling phases and the results of detecting the delimiter pattern. In these figures, a column 2-1 indicates a waveform of the burst data signal, a column 2-2 indicates the numbers of the sampling phases, a column 2-3 indicates the results of detecting the delimiter pattern with the different sampling phases, and a column 2-4 indicates sampling clocks of the one-bit period having the different phases by "↑".

As has been described previously, the burst synchronizing circuit according to the embodiment of the present invention samples the input data signal with the plurality of sampling phases having phase differences finer than the one-bit width by using a high-speed clock, a multi-phase clock or a delay element, and detects, for each sampling phase, the data pattern which coincides with the predetermined delimiter pattern.

In the embodiment of the present invention illustrated, the difference between the adjacent sampling phases is equal to ⅛ of the one-bit width. That is, one-bit data is sampled by the eight sampling clocks having the different phases.

1–#16 of the sampling phases 2-2 shown on the left sides of FIGS. 7 through 9 indicate the phases of the sampling clocks related to the detection of the delimiter pattern, that is, the sampling phases. The burst data signal is sampled by the nine sampling clocks "↑" of the different sampling phases, and the delimiter pattern is detected for each of the sampling phases from the nine pieces of sampled data. The results of detecting the delimiter pattern shown in the column 2-3 are indicated by a pattern detection flag signals "1" or "0" for each of the sampling phases.

The pattern detection flag signal "1" shown in the column 2-3 of the delimiter pattern detection results represents that the delimiter pattern is detected. The pattern detection flag signal "1" represents that the delimiter pattern is not detected. An expression "1" or "0" represents that the delimiter pattern may be detected or not.

FIG. 7 shows a result of detecting the delimiter pattern for each sampling phase in a case where nine-bit sampling data is cut out from sampling data located one bit ahead of the position of the delimiter pattern and sampling data located one bit behind of the position thereof.

As shown in FIG. 7, the delimiter pattern is always detected with the sampling phases (#6–#10) in which the nine sampling clocks exist in the phase selection area in which the delimiter pattern is definitely detected. In contrast, the positions of the edges are not ensured in the sampling phases (#3–#5 and #11–#13) in the edge-indeterminate areas in which the sampling clocks exist in the vicinity of the edges of the respective bits. Hence, it is not indefinite whether the delimiter pattern is detected. In the case of FIG. 7, the delimiter pattern is not detected with the sampling phases (#1, #2 and #14–#16) from the preamble PR7 which is one bit ahead of the delimiter pattern to the delimiter DL8 and those from the delimiter DL2 which is one bit behind of the delimiter pattern to the payload PL1.

FIG. 8 shows a result of detecting the delimiter pattern for each sampling phase in a case where nine bits of sampled data are extracted from the sampled data located in the areas which are respectively located one bit ahead and one bit behind of the position which is one bit ahead of the delimiter pattern.

In the phase select area including the sampling phases (#6–#10) shown in FIG. 8, nine bits of the preamble PR7 located one bit ahead of the delimiter pattern to the delimiter DL8, and thus the delimiter pattern is not detected with the sampling phases of the above phase select area.

The results of sampling with the phases of the edge-indeterminate areas are indefinite. Hence, the delimiter pattern may be detected or not with the sampling phases (#3–#5 and #11–#13) in the edge-indeterminate areas.

The delimiter pattern is not detected with the sampling phases (#1, #2) from the preamble PR6 which is one bit ahead to the delimiter DL7, while the delimiter pattern is detected with the sampling phases from the delimiter DL1 which is one bit behind to the delimiter DL9.

FIG. 9 shows a result of detecting the delimiter pattern for each sampling phase in a case where nine bits of sampled data are extracted from the sampled data located in the areas which are respectively located one bit ahead and behind of behind the position which is three bits ahead of the delimiter pattern.

The delimiter pattern may be detected with the sampling phases (#3–#5 and #11–#13) of the edge-indeterminate areas because the results of sampling are indefinite. In contrast, the delimiter pattern is not detected with the remaining sampling phases (#1, #2, #14–#16).

In order to make an arrangement such that the delimiter pattern is detected with only the sampling phases of the bit positions in which the delimiter pattern exists and is not detected with the sampling phases of the other bit positions, it is necessary to arrange the pattern data so that the delimiter pattern is detected in the position of the delimiter in a case where data equal to the length of the delimiter pattern (nine bits) is extracted from the areas including the preamble, the delimiter and the first bit of the payload (one bit immediately after the delimiter).

As shown in FIGS. 7 through 9, in the case where the delimiter pattern is detected with a plurality of different sampling phases, the pattern detection flag "1" is output with only the sampling phases in which the delimiter pattern exists, and the pattern detection flag "0" is detected with the other sampling phases.

Hence, when the results of pattern detection (the pattern detection flags) with the different sampling phases, are arranged in the sequence of sampling phases, the effects similar to those obtained by the both-side edge detection can be obtained. Hence, it is possible to perform the both-side edge detection by pattern detection and select sampled data with the optimal phase by applying the principle of the conventional two-side edge detection. Thus, the conventional both-side edge detection method will be described again with reference to FIG. 10.

The both-side edge detection method detects the both-side edges of the pulse signal which is one time slot of a data signal alternately changing to "1" and "0", and select, as the sampling phase, the phase in an intermediate position (substantially central position) of the section between the both-side edges. At that time, the phase select area (having a phase with which the data signal can definitely be sampled) and the edge-indeterminate areas with respect to one time slot shown in part (A) of FIG. 10 are allocated so that the phase located in the center of the section between the both-side edges is located within the phase select area as long as the both-side edges of the one-bit pulse are located within the edge-indeterminate areas which are spaced apart from each other at a given interval.

Hence, when the both-side edge detection method is used, the phase of the center of the section between the both-side edges is located in the phase select area as long as the edges are located within the edge-indeterminate areas even if the pulse width becomes longer or shorter. Hence, data can definitely be sampled with the above phase of the center. The above is illustrated in parts (A) through (D) of FIG. 10.

Figure 10:
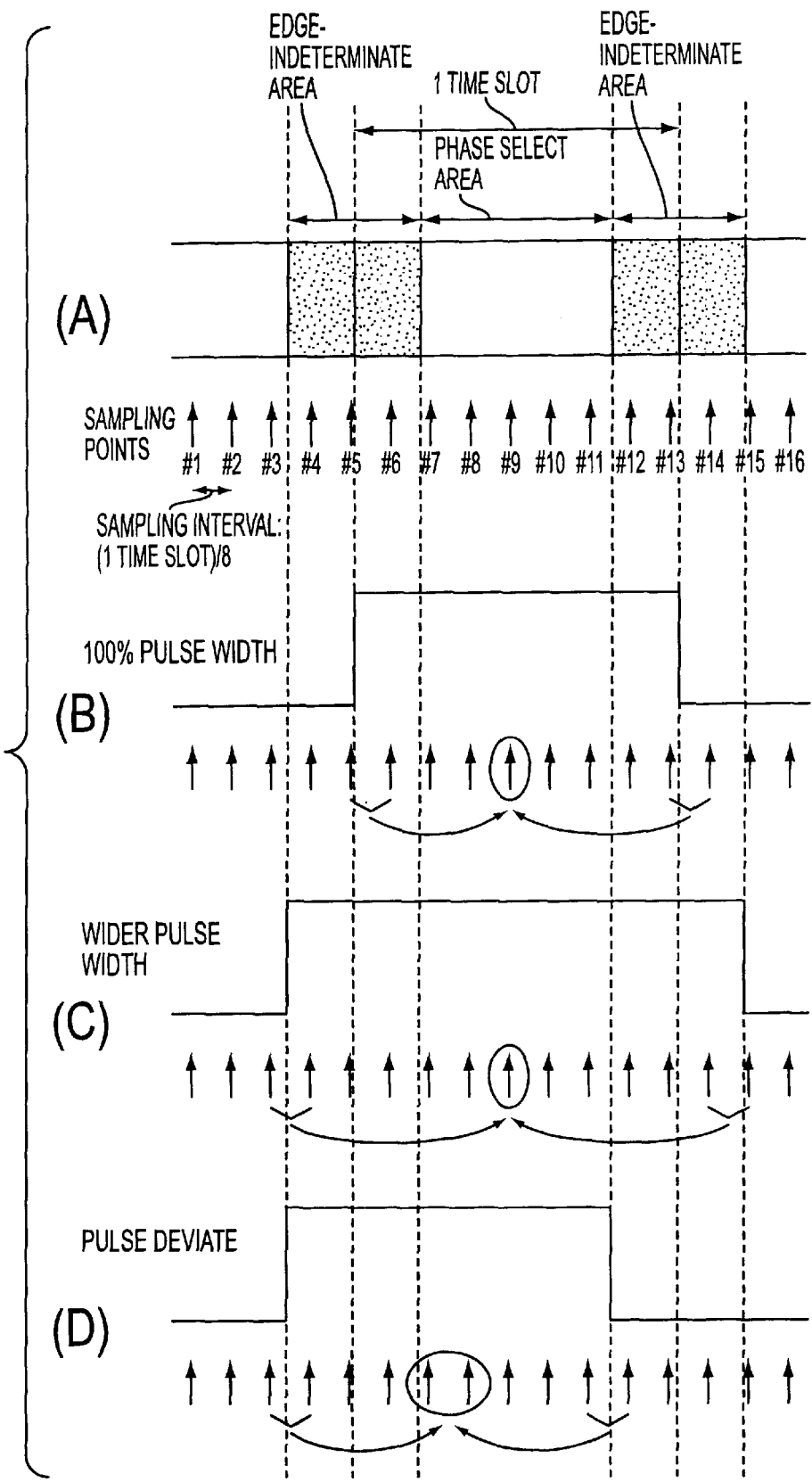
FIG. 10 is a timing chart illustrating a conventional both-side edge detecting method.

Part (B) of FIG. 10 shows a case where the pulse width has the specified length (100%), and part (C) thereof shows a case where the pulse width is longer than the specified length. Part (D) of FIG. 10 shows a case where the pulse position deviates from the specified position. In any of the above cases, the phases located in the center of the section between the edges of the both edges of the pulse (enclosed with ovals in FIG. 10) are located in the phase select area and are capable of certainly sampling the data signal as long as the both-side edges are located within the specified edge-indeterminate areas.

A description will now be given, with reference to FIG. 11, of selection of the sampling phase by the pattern detection of the present invention. Although FIG. 11 illustrates only one time slot, the sampling phase selection is involved in the length of the delimiter pattern (equal to nine bits in the aforementioned example).

Figure 11:
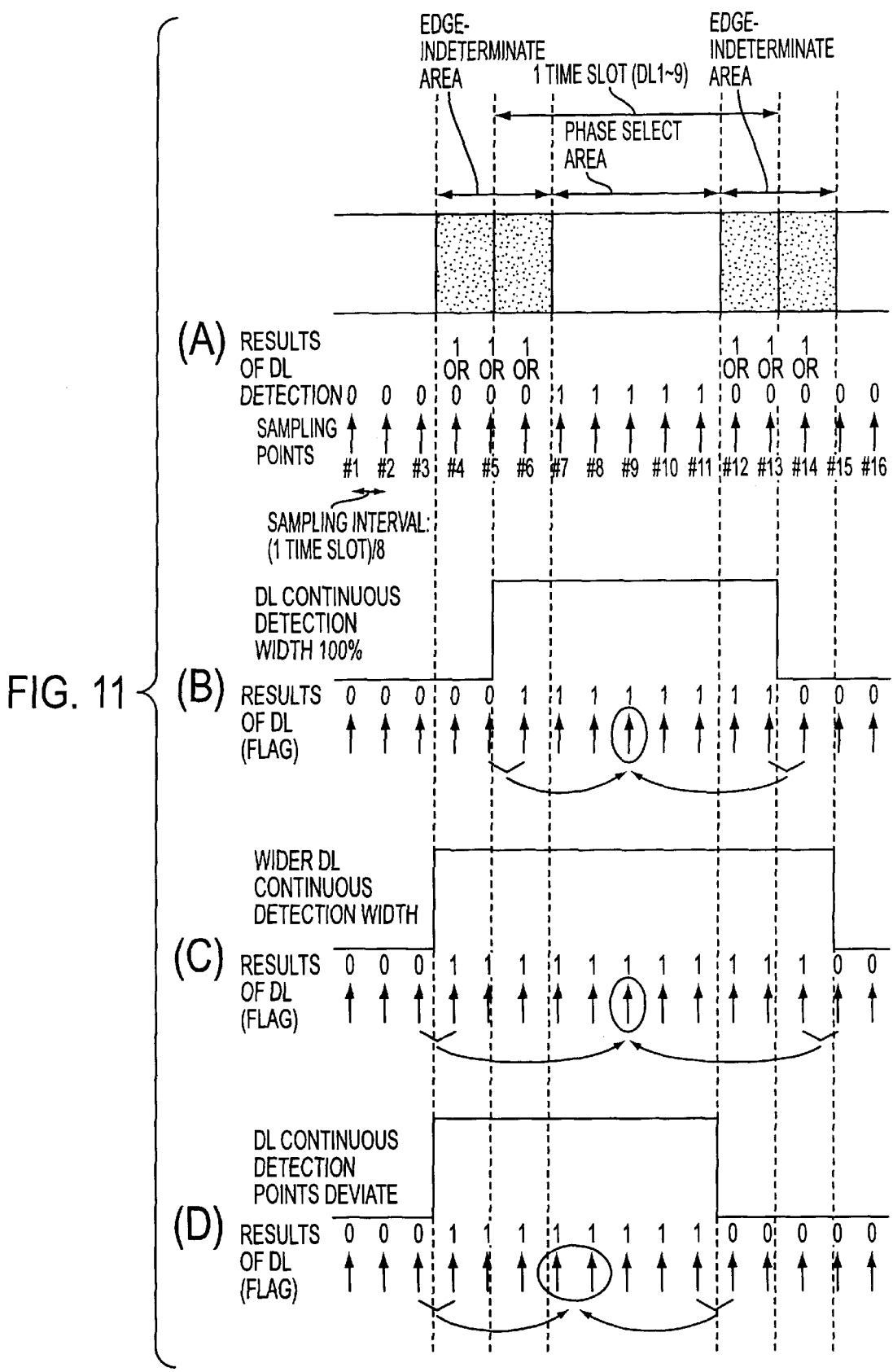
FIG. 11 is a timing chart of selection of sampling phases using a pattern detection of the present invention.

As shown in part (A) of FIG. 11, the result of detection of the delimiter pattern DL indicates "1" with the sampling phase in the phase select area and indicates "1" or "0" (indefinite) in the edge-indeterminate areas. Further, the result of detection of the delimiter pattern indicates "0" with the sampling phase in the phase select areas which are located one bit ahead or behind.

An arrangement of the above results of detection of the delimiter pattern obtained with the different sampling phases is equivalent to that obtained by sampling the data input pattern of "010" by the aforementioned both-edge detection method. The phase of the changing point at which the delimiter pattern DL changes is related to the edge portions of the one-bit pulse located on the both sides thereof, and the sampling phases located in the central portion are located in the phase select area.

Hence, as in the case where the both-side edge detection method, the phase in the center of the section between the both-side edges is located in the phase select area even if the time period (pulse width) having the phases with which the delimiter pattern can successively be detected becomes longer or shorter. Hence, the data can certainly be sampled with the above phase located in the center. Parts (A) through (D) of FIG. 11 illustrate the above.

Part (B) of FIG. 11 shows a case where the width (pulse width) of continuously detecting the delimiter pattern is equal to the specified value (100%), and part (C) thereof shows a case where the above pulse width is longer than the specified value. Part (D) of FIG. 11 illustrates that the position in which the delimiter pattern is continuously detected deviates from the specified position.

In any of the above cases, the phases located in the center of the section between the edges of the both edges of the pulse are located in the phase select area and are capable of certainly sampling the data signal as long as the both-side edges are located within the specified edge-indeterminate areas.

Hence, the arrangement of selecting the sampling phase by detection of the delimiter pattern according to the embodiment of the present invention can certainly sample the input data signal which is applied under the same condition as that required for the both-side edge detection method. That is, the sampling phase selecting arrangement of the present embodiment does not need the preamble pattern (for example, "010") for burst synchronization although the tolerable variation in the pulse width of the input data signal is the same as that of the both-side edge detection method. Hence, it is possible to reduce the length of the header (preamble) for burst data transmission and use the resultant bits thus available to transmission of user information.

The above-mentioned embodiment of the present invention assumes that there is no bit error caused during transmission. However, in practice, the pulse width of the input data signal may be altered over the tolerable range due to the condition of the transmission path or deterioration of the S/N ratio in the optical module. In the worst case, a bit error may occur. Hence, it is necessary to take measures against such a bit error in practice.

In the conventional both-side edge detection method, the phase to be selected is determined by the one-time both-side edge detection process. Hence, if the both-side edges deteriorate, in other words, if at least one of the edges of the pulse of the data signal is located beyond the corresponding edge-indeterminate area, an erroneous phase may be selected, as shown in FIG. 12.

Figure 12:
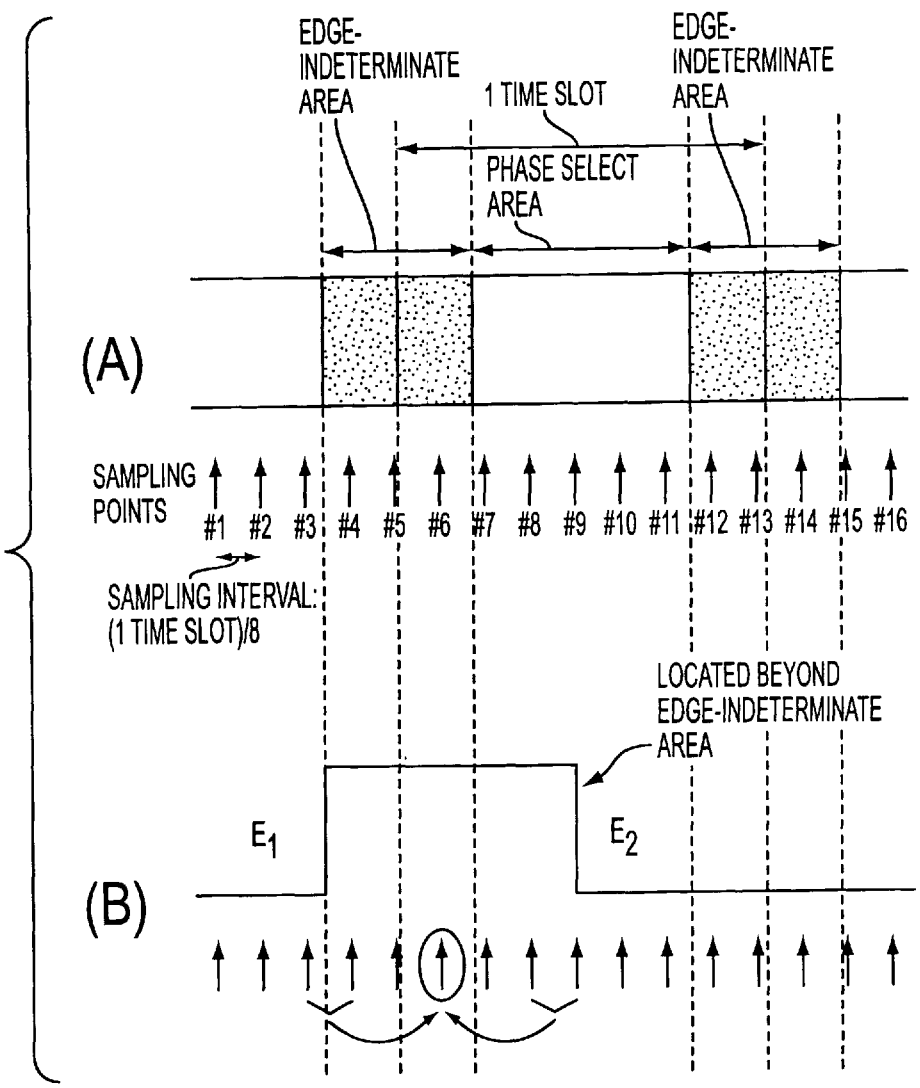
FIG. 12 is a timing chart showing a case where an edge of a pulse is located beyond an edge-indeterminate area.

Part (A) of FIG. 12 illustrates the phase select area and the edge-indeterminate areas with respect to one time slot, and part (B) thereof illustrates the trailing edge of the pulse exceeds the edge-indeterminate area. As shown in part (B) of FIG. 12, when edge E2 is located beyond the edge-indeterminate area, the phase located at the center of the section between edges E1 and E2 enters into the edge-indeterminate area, and does not function as the appropriate sampling phase.

If one of the edges of the one-bit pulse is located beyond the corresponding edge-indeterminate area as described above, the conventional both-side edge detection method cannot select the appropriate sampling phase. This holds true for the conventional single-side edge detection method.

In contrast, according to the pattern detection method of the present invention, it is possible to provide the pattern detection for each sampling phase with an error correcting function, that is, a function of protection against error. With the above function, it is possible to sample data with the appropriate phase based on the results of detection of the whole-pattern even if variation in the pulse width exceeds the tolerable range with a certain probability.

Figure 13:
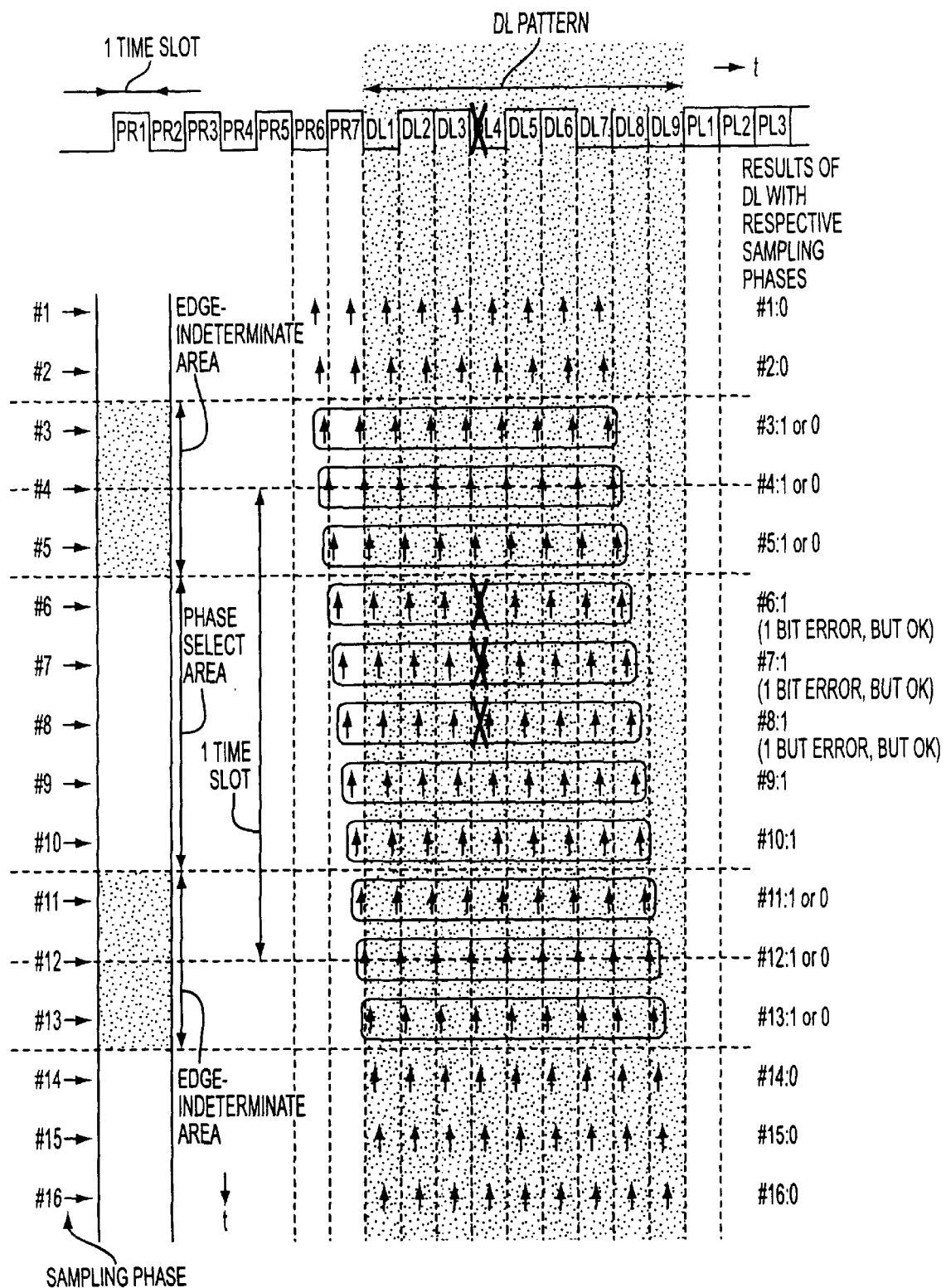
FIG. 13 is a diagram showing a relationship among a burst data signal, sampling phases and results of detecting a delimiter pattern having an error correcting function.

FIG. 13 illustrates a burst data signal, sampling phases and results of detection of the delimiter pattern with the error correcting function. In the delimiter pattern detection equipped with the one-bit error correcting function, the edge of the pulse located between the third bit DL3 of the delimiter pattern and the fourth bit DL4 thereof exceeds the specific or tolerable variation in the pulse width, and the delimiter pattern bit DL4 is erroneously sampled with sampling phases #6–#8 of the phase select area.

In the above case, the delimiter pattern is normally detected with sampling phases #9–#10 in the phase select area. Further, even with sampling phases #6–#8, the delimiter pattern can be detected by correcting an erroneous one bit of the delimiter pattern of nine bits by performing the one-bit error correcting operation on the remaining eight bits.

In other words, it is possible to obtain, for each of all the sampling phases in the phase select area, the detection results indicating the presence of the delimiter pattern (the pattern detection flag indicates "1"). Hence, it is possible to select the appropriate phase for sampling from the results of detecting the delimiter pattern as in the case of the process for the input data signal having no distortion.

As described above, the selection of the sampling phase according to present invention is also superior to that by the conventional both-side edge detection method because the present invention can be equipped with the protection means against bit error.

However, in order to protect the selection of the sampling phase against a distortion (bit error) of the burst header (delimiter pattern), it is necessary to set the preamble and the delimiter pattern having a sufficient Humming distance so that the delimiter pattern can be detected in the position of only the delimiter when the delimiter pattern length is extracted from the beginning of the preamble even if a bit error having bits less than the specific number of bits occurs in the bit areas including the preamble, the delimiter and the first bit of the payload (one bit immediately after the delimiter pattern).

As described above, the both-side edge detection method is superior to the single-side edge detection method because the former method has a larger tolerable variation in the pulse width than the latter method. Further, the present invention is superior to the both-side edge detection method because the present invention does not need any data pattern which alternately changes to "0" and "1" and has the bit error correcting function. Thus, the present invention can establish the burst synchronization with respect to the burst signal having a shorter burst header more definitely than the two-side edge detection method.

The multiple-point edge detection method determines the sampling phase to be selected by the averaging or majority operation on the results of sampling a plurality of bits of the data signal. In order to improve the reliability of phase selection, it is required to increase the number of bits to be acquired. However, this requirement causes a delay in selection of the sampling phase. In this regard, the selection of the sampling phase based on the pattern detection according to the present invention is superior to the multiple-point edge detection method.

In the above description of selection of the sampling phase based on the pattern detection according to the present invention, the delimiter pattern is used as a pattern to be detected. Alternatively, the pattern is not limited to the delimiter pattern. For example, a data pattern obtained by an operations, such as an ATM cell header or HEC data can be used and detected with a plurality of sampling phases.

A description will now be given, with reference to FIGS. 14A through 24, of structures of the data sampling part 1-1, the pattern detecting part 1-2, the select signal generating part 1-3, and the selector 1-4.

FIGS. 14A–14D and FIG. 15 show structures of the data sampling part 1-1. More particularly, FIGS. 14A–14D employ a plurality of delay elements which delay the burst data input signal. The delayed burst data input signals are sampled by a system clock of a one-bit width or one time slot.

Figure 14A:
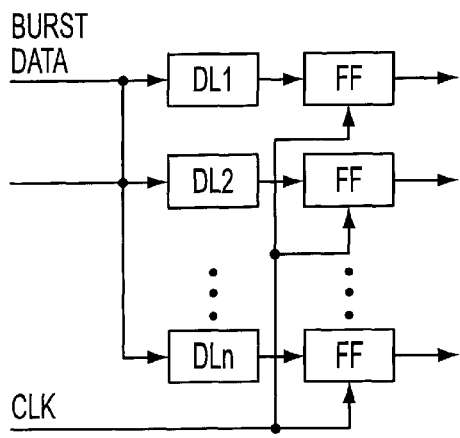
FIGS. 14A, 14B, 14C and 14D show structures of a data sampling part used in an embodiment of the present invention.

The structure shown in FIG. 14A uses n delay lines DL1–DLn (n is an integer), which have mutually different delay amounts and are connected in parallel. The burst data input signal is applied to the delay lines DL1–DLn, and the output signals thereof are latched or sampled in flip-flops FF in response with the system clock CLK.

Figure 14B:
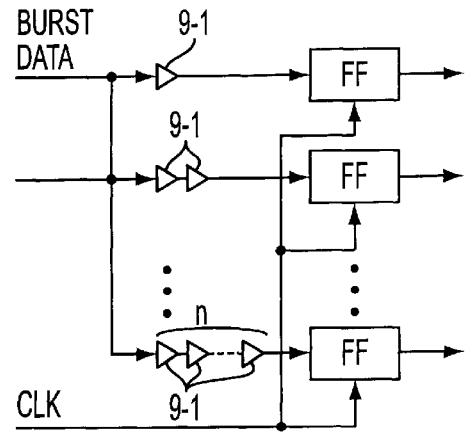

The structure shown in FIG. 14B uses buffer amplifiers 9-1, which are substituted for the delay lines DL1–DLn. Each of the buffer amplifiers 9-1 has-an identical delay amount. One buffer amplifier 9-1 is provided to the delay line DL1, and two buffer amplifiers 9-1 are provided to the delay line DL2 and are cascaded. Similarly, n buffer amplifiers 9-1 are provided to the delay line DLn and are cascaded. Thus, the n different delay amounts are defined.

Figure 14C:
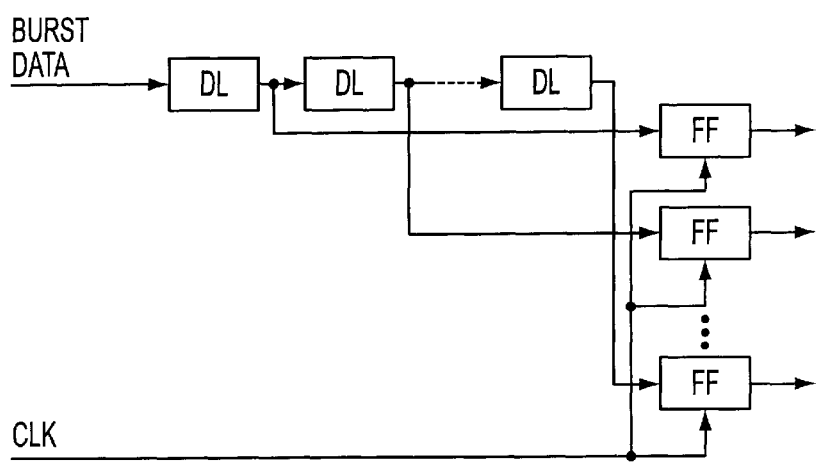

The structure shown in FIG. 14C include n delay lines DL which have an identical delay amount and are cascaded. The burst data signal is applied to the delay line DL of the first stage of the cascaded connection. Flip-flops, which are supplied with the system clock CLK, latch the output signals of the respective delay lines.

Figure 14D:
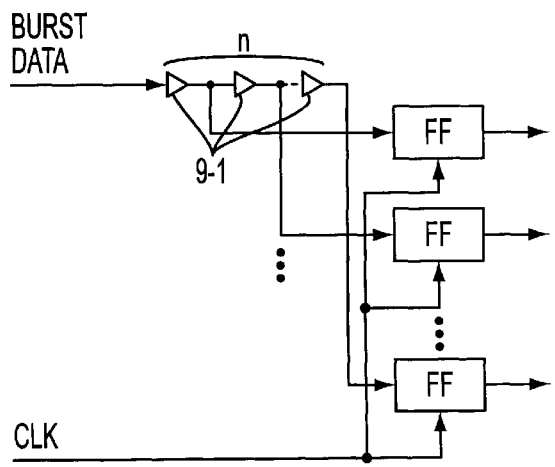

The structure shown in FIG. 14D is a variation of the structure shown in FIG. 14C obtained by replacing the delay lines DL by the buffer amplifiers 9-1.

Figure 15A:
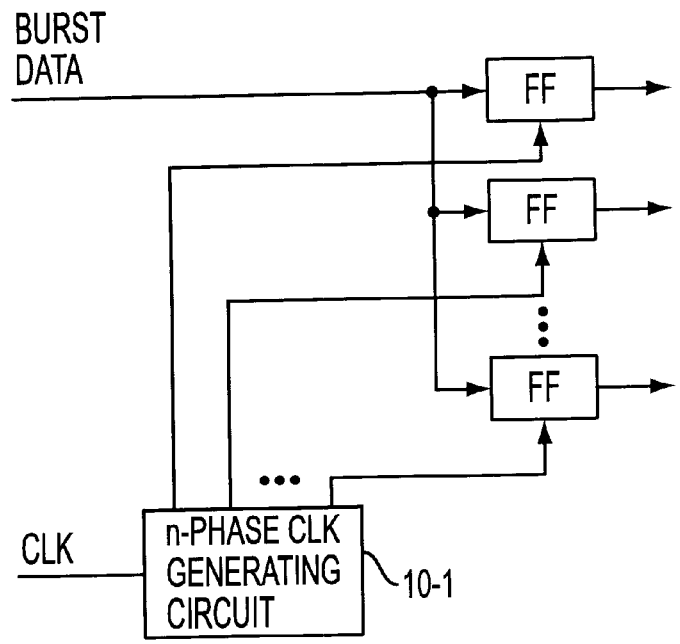
FIGS. 15A and 15B show structures of the data sampling part used in an embodiment of the present invention.

FIG. 15A shows another structure of the data sampling part 1-1, in which an n-phase clock generating circuit 10-1 is used to make multiple phases of the system clock CLK. The system clocks having the mutually different phases are applied to the respective flip-flops FF. The difference between the adjacent phases is equal to 1/n of the period of the system clock CLK.

Figure 15B:
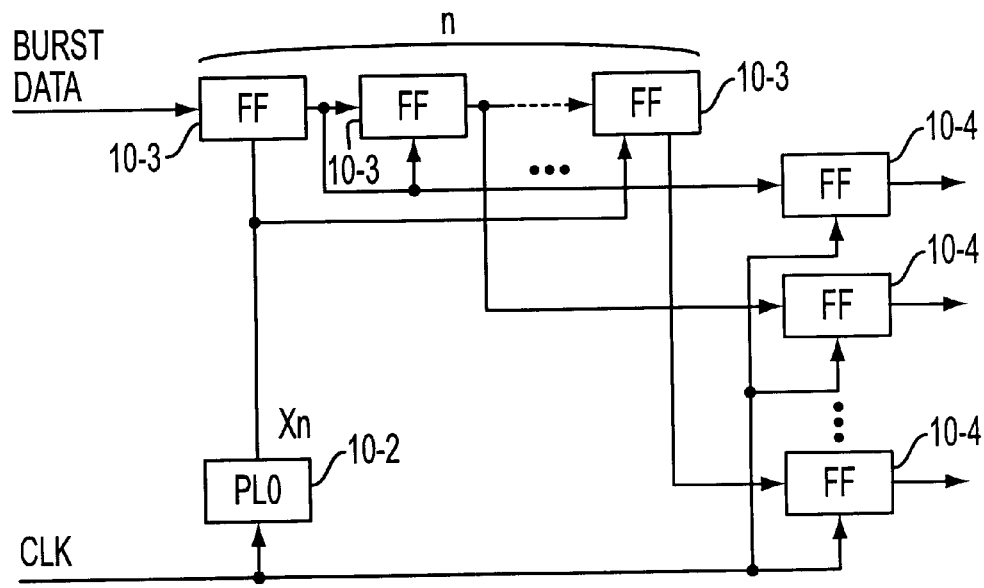

FIG. 15B shows yet another structure of the data sampling part 1-1, in which an oscillator (PLO) 10-2 is provided. The oscillator 10-2 multiples the system clock CLK by n, so that a faster system clock having a speed equal to n times that of the original system clock can be generated. The n-multiplied system clock is applied to flip-flops 10-3 which are cascaded. The burst data is applied to the flip-flop 10-3 of the first stage. The output signals of the flip-flops 10-3 having the mutually different phases (by a time equal to 1/n of the period of the system clock) are latched to respective flip-flops 10-4, which are supplied with the original system clock.

Figure 16:
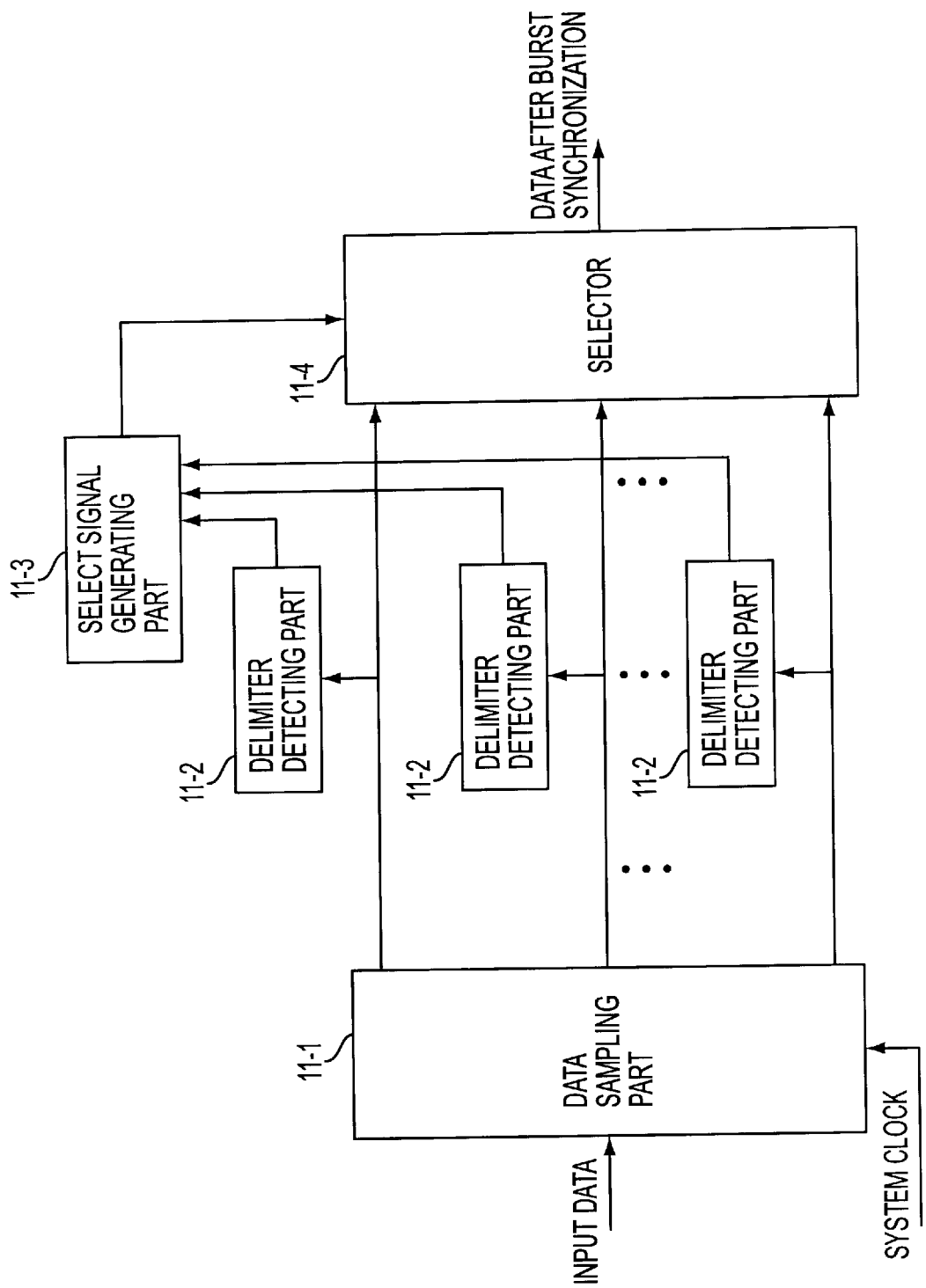
FIG. 16 is a block diagram of a burst synchronizing circuit capable of detecting a delimiter pattern according to an embodiment of the present invention.

FIG. 16 is a block diagram of the burst synchronizing circuit 1-2 capable of detecting the delimiter pattern as has been described previously. The burst synchronizing circuit 1-2 shown in FIG. 16 includes a data sampling part 11-1, a delimiter pattern detecting part 11-2, a select signal generating part 11-3, and a selector 11-4.

The data sampling part 11-1, which has any of the structures shown in FIGS. 14A–14D and FIGS. 15A and 15B, outputs sampled data obtained with the different sampling phases. The delimiter pattern detecting part 11-2 extracts, for each sampled data obtained with the respective sampling phase, data having a length equal to that of the delimiter pattern, and outputs the result of detecting the delimiter pattern (pattern detection flag).

The select signal generating part 11-3 compares the results of detecting the delimiter pattern obtained with the adjacent sampling phases with each other, and recognizes the phases of the both-side edges of one pulse from the phase in which a change of the results occurs. Then, the part 11-3 generates a select signal for selecting the phase located in the center from the recognized phases. The select signal thus generated is output to the selector 11-4.

In response to the select signal, the selector 11-4 selects the sampled data having the optimal phase from among the sampled data having the mutually different phases output by the data sampling part 11-1. By the above-mentioned manner, the data signal after the burst synchronization is output from the burst synchronizing circuit.

Figure 17:
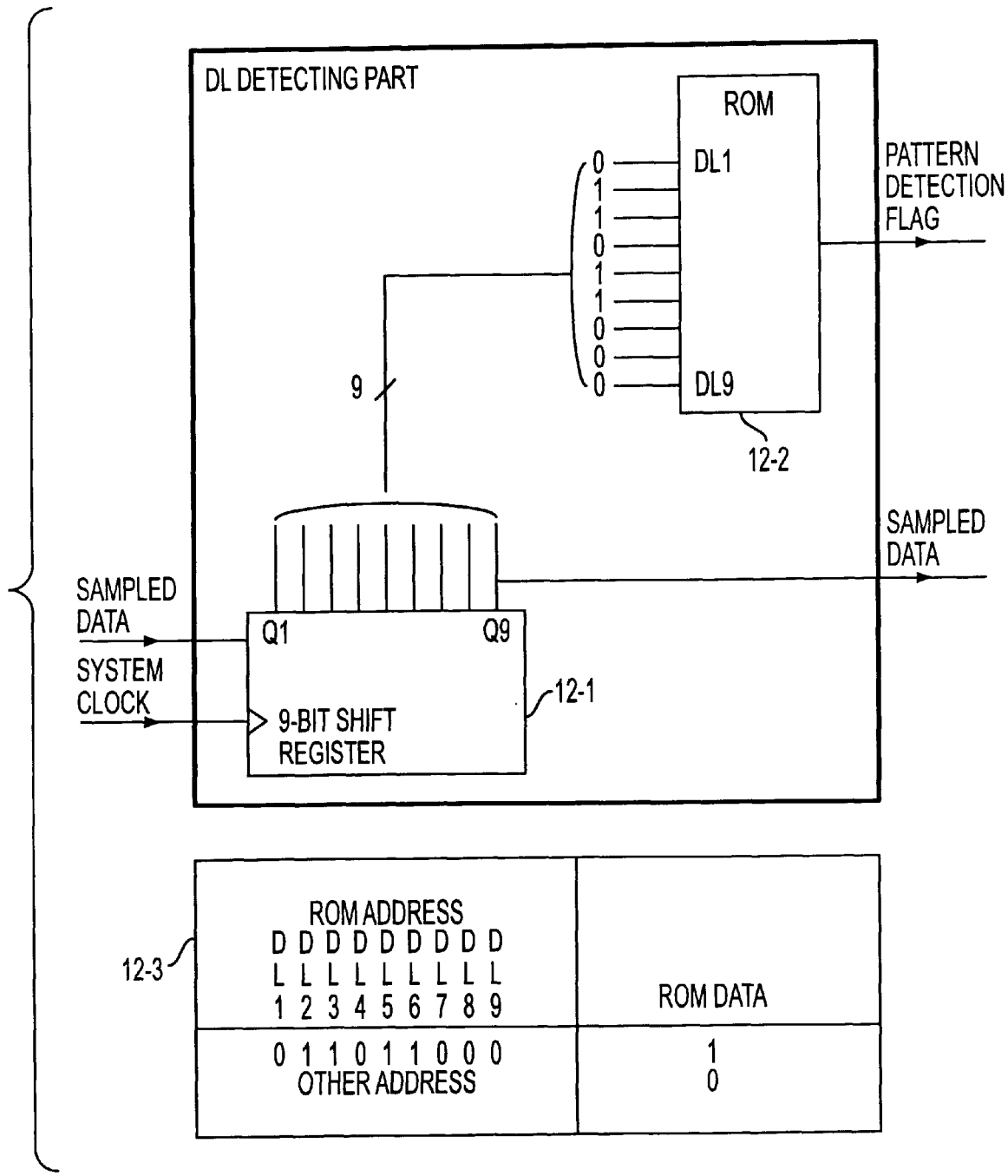
FIG. 17 is a diagram illustrating a delimiter pattern detecting part using a ROM and a table stored therein.
Figure 18:
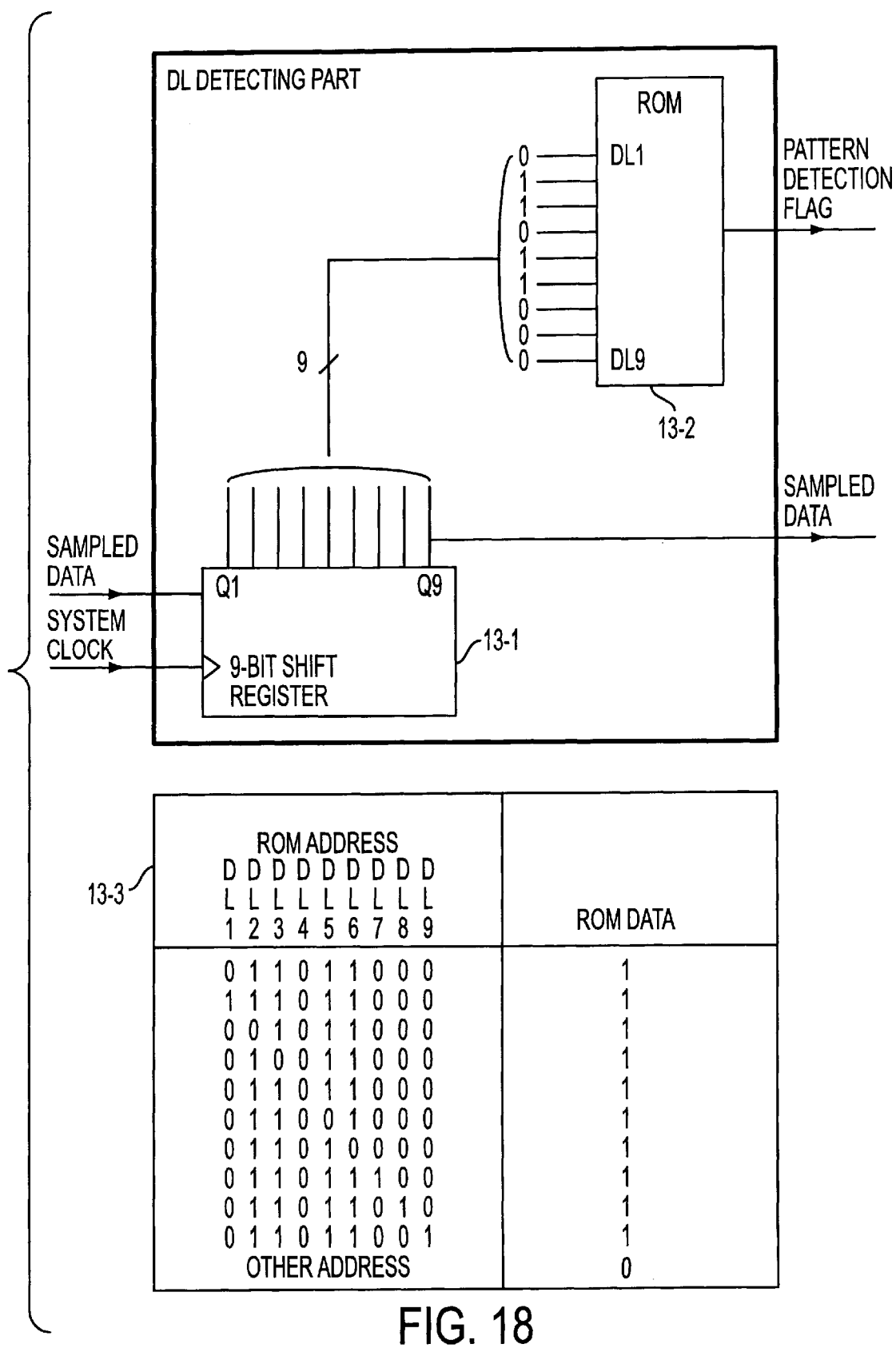
FIG. 18 is a diagram illustrating a part of detecting a delimiter pattern including a bit error equipped with a ROM and a table stored therein.
Figure 19:
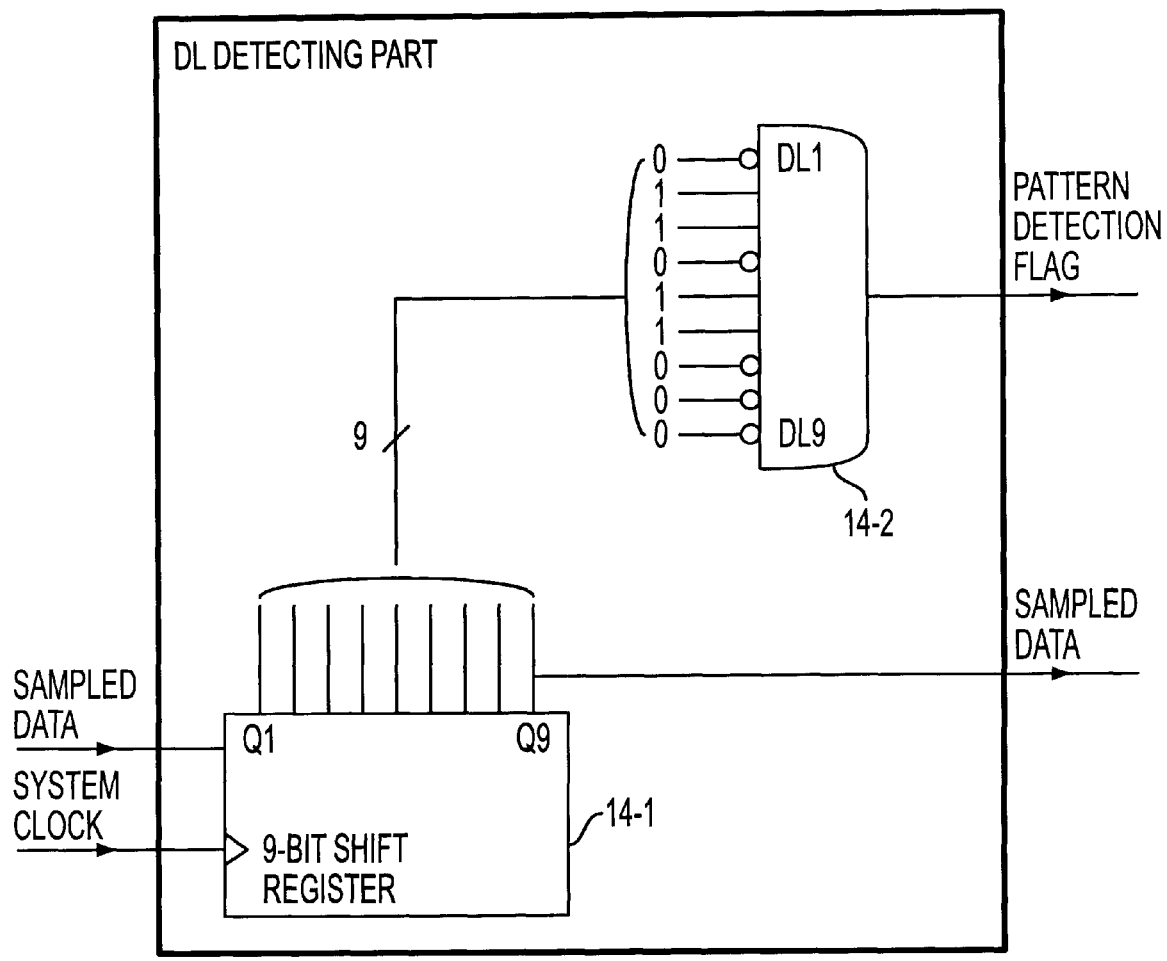
FIG. 19 is a diagram of a structure of detecting a delimiter pattern using a logic circuit.

FIGS. 17 through 19 show structures of the delimiter pattern detecting part. More particularly, FIG. 17 shows a delimiter pattern detecting part using a ROM and a table stored therein. Sampled data are stored in a 9-bit shift register 12-1 in synchronism with the system clock CL. The 9-bit output signal of the shift register 12-1 is applied, as an address signal (DL1–DL9), to the ROM 12-2. Data stored in the ROM 12-2 and thus read are output as the pattern detection flags.

In the table 12-3 stored in the ROM 12-2, the pattern detection flag "1" is set to only the address values (DL1–DL9) which coincide with, for example, "011011000", and the pattern detection flag "0" is set to the other address values. Hence, the delimiter pattern is checked on the system clock basis, and the pattern detection flag "1" is output from the ROM 12-2 only when the delimiter pattern which coincides with the address (DL1–DL9) is input.

FIG. 18 shows another structure of the delimiter pattern detecting part using a ROM and a table stored therein. The sampled data are stored in a 9-bit shift register 13-1 in synchronism with the system clock, and the output signal of the 9-bit shift register 13-1 is applied, as an address signal (DL1–DL9), to a ROM 13-2. Data stored in the ROM 13-2 are output as the pattern detection flags.

In the table 13-3 stored in the ROM 13-2, the pattern detection flag "1" is set to only the address values (DL1–DL9) which coincide with, for example, "011011000", or certain other patterns differing from "011011000" by only one bit value, and the pattern detection flag "0" is set to the other address values. Hence, the delimiter pattern is checked on the system clock basis, and the pattern detection flag "1" is output from the ROM 13-2 only when the delimiter pattern which coincides with the address (DL1–DL9) is input.

FIG. 19 shows a structure of the delimiter pattern detecting part using a logic circuit and coping with bit error. The sampled data are stored in a 9-bit shift register 14-1 in synchronism with the system clock, and the output signal of the 9-bit shift register 14-1 is applied, as an input signal (DL1–DL9), to an AND logic circuit 14-2. The AND logic circuit 14-2 has inverting input terminals arranged in positions in which bits "0", of the delimiter patter are applied. Only when the sampling data coinciding with the delimiter pattern is input, the AND logic circuit 14-2 outputs the pattern detection flag "1".

Figure 20:
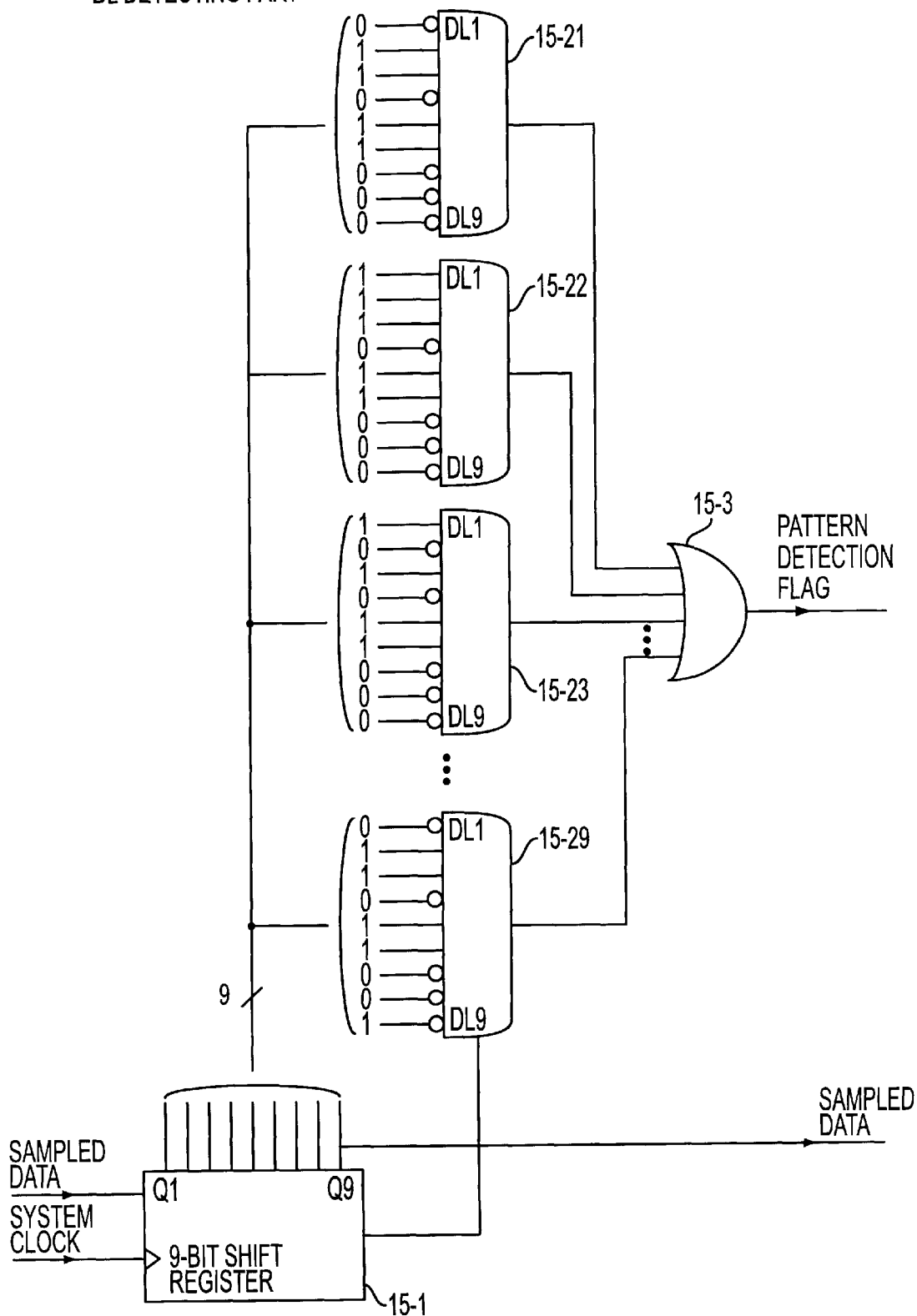
FIG. 20 is a diagram of a ROM-equipped structure of detecting a delimiter pattern including a bit error and a table stored therein.

FIG. 20 shows another structure of the delimiter pattern detecting part using a logic circuit and coping with bit error. The sampled data are stored in a 9-bit shift register 15-1 in synchronism with the system clock, and the output signal of the 9-bit shift register 14-1 is applied, as an input signal (DL1–DL9), to AND logic circuits 15-21–15-29. The AND logic circuit 15-21 has inverting input terminals in which bits "0" of the delimiter pattern are applied. The inverting input terminals of the AND logic circuits 15-22–15-29 are located in positions in which "0" included in patterns which have a-one-bit difference from the delimiter pattern. An OR logic circuit 15-3 performs an OR operation on the output signals of the AND logic circuits 15-21–15-29. Hence, pattern detection flag "1" is output only when sampled data coinciding with the delimiter pattern or a pattern which differs from the delimiter pattern by only one bit is input.

Figure 21:
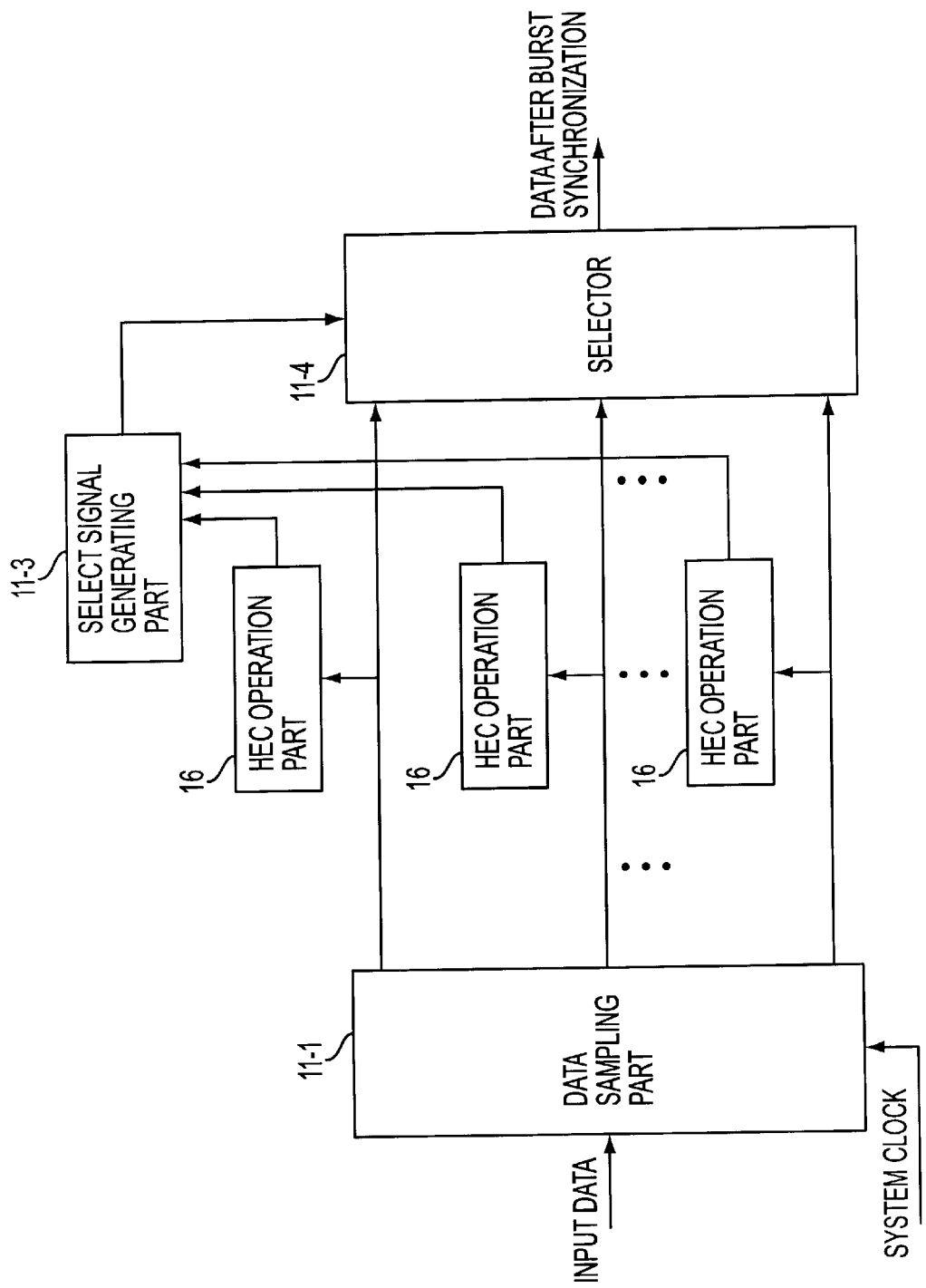
FIG. 21 is a block diagram of a burst synchronizing circuit capable of detecting an HEC pattern in an ATM cell header.

FIG. 21 shows a structure of the burst synchronizing circuit which detects a data pattern of the HEC of the ATM cell header according to an embodiment of the present invention. The burst synchronizing circuit shown in FIG. 21 includes the data sampling part 11-1, an HEC operation part 16, the select signal generating part 11-3 and the selector 11-4.

The structure shown in FIG. 21 is configured by replacing the delimiter pattern detecting part 11-2 shown in FIG. 16 by the HEC operation part 16. As has been described previously, the ATM cell header has the HEC field, in which a pattern (HEC pattern) for error control of the ATM cell header is stored.

In the system in which ATM cells are transmitted in the burst formation, it is possible to establish the burst synchronization by using the HEC pattern instead of the aforementioned delimiter pattern. The HEC pattern can be obtained by an operation. The HEC operation part 16 outputs the pattern detection flag "1" when detecting the HEC pattern.

Figure 22:
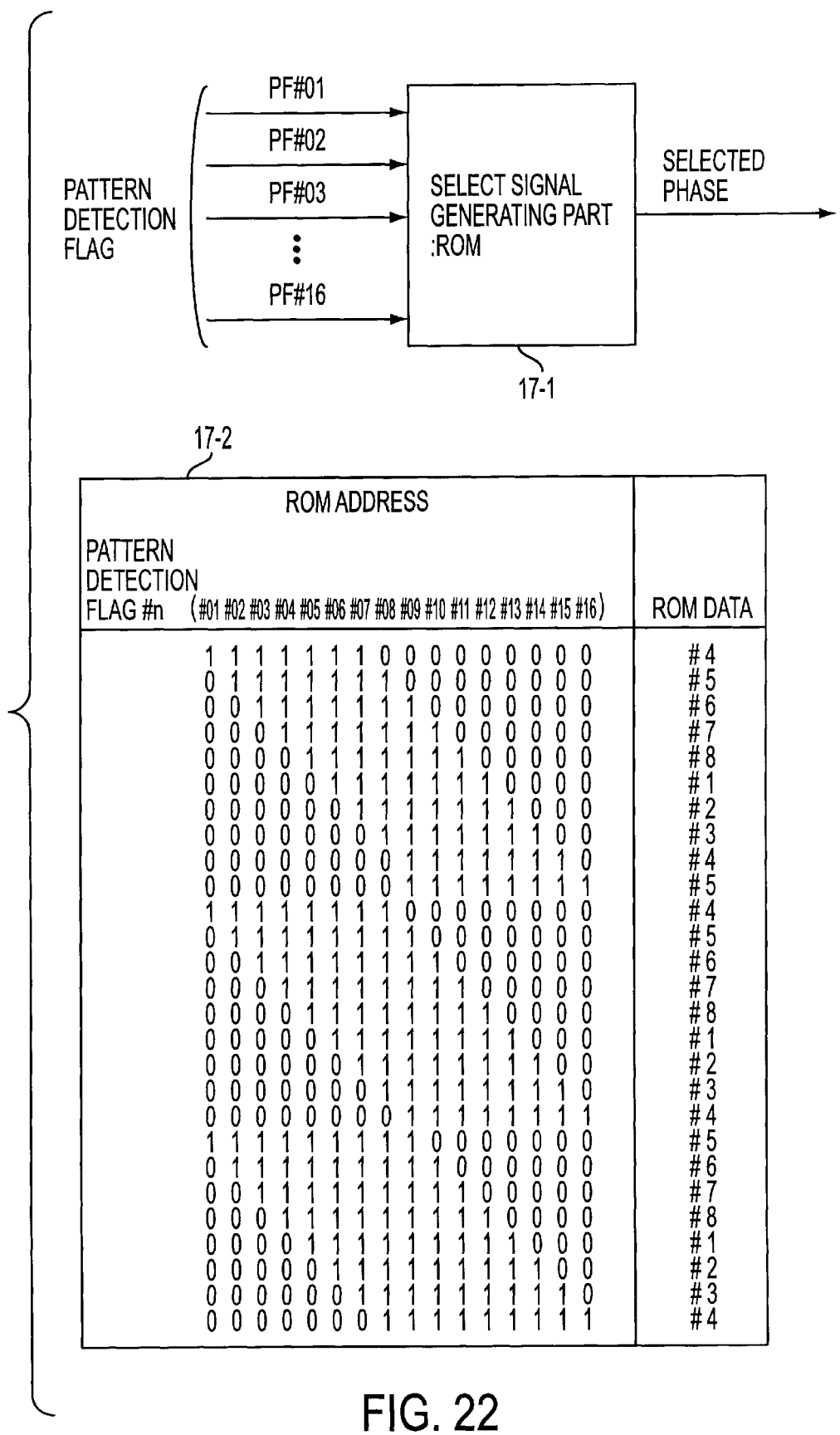
FIG. 22 is a diagram illustrating a part of a select signal generating part equipped with a ROM and a table stored therein.

FIG. 22 shows a structure of the select signal generating part using a ROM and a table stored therein. The select signal generating part is formed of a ROM 17-1, which is supplied, as its address signal, with pattern detection flags PF#01–PF#16 corresponding to 16 sampling phases output by the pattern detecting part.

A table 17-2 stored in the ROM 1701 stores, as ROM data, select phase information which can be accessed by data information concerning the pattern detection flags corresponding to the 16 sampling phases. The table 17-2 shown in FIG. 22 stores examples of the optimal sampling phases to be selected when 7, 8 or 9 consecutive pattern detection flags "1" are applied to the ROM 17-1 as the address signal thereof.

The selected phase output by the select signal generating part shown in FIG. 22 is applied to the selector, which thus selects the sampled data having the optimal sampling phase from among the pieces of sampled data having the different phases.

Figure 23:
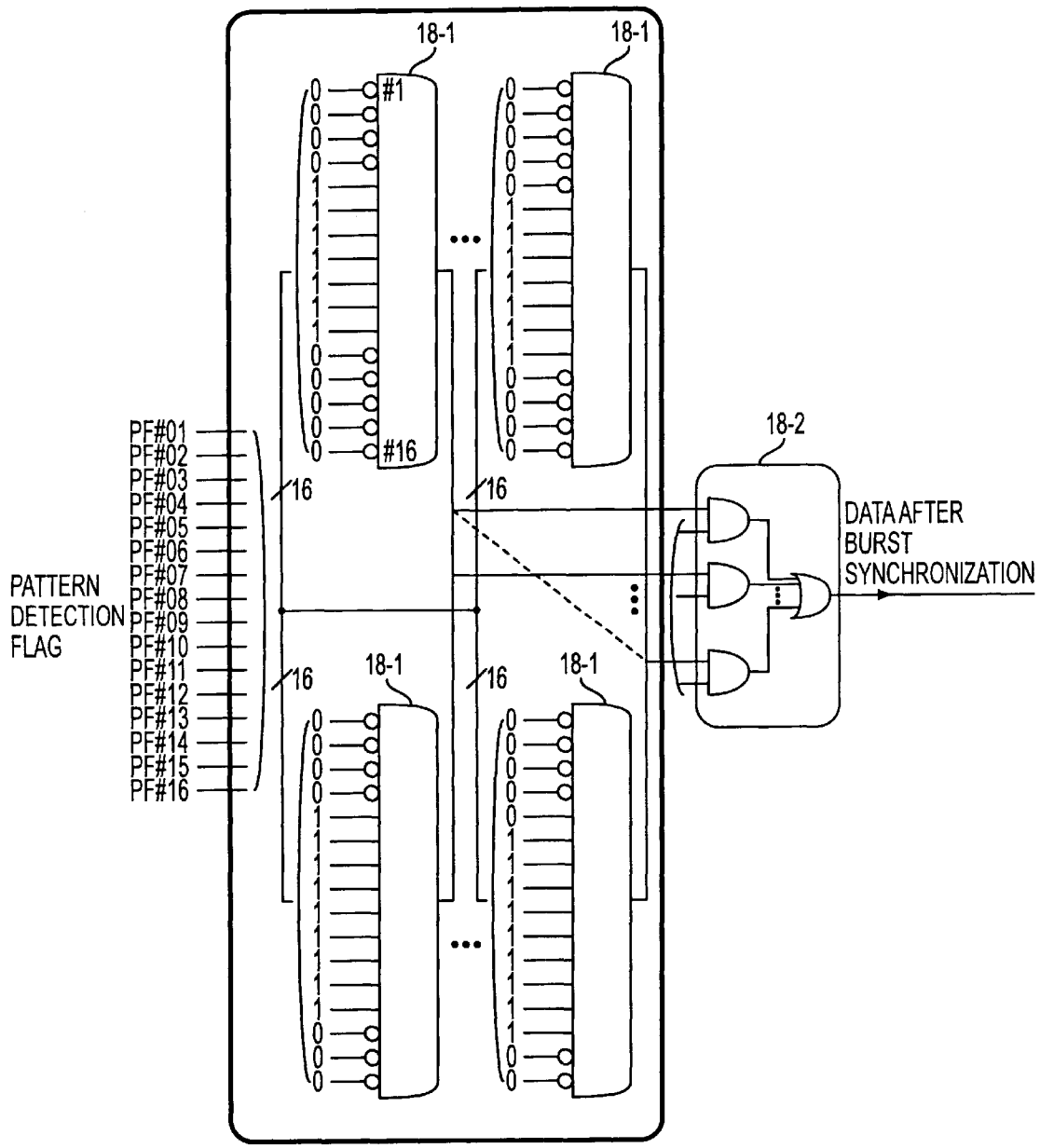
FIG. 23 is a diagram of a select signal generating part and a selector using logic circuits.

FIG. 23 shows structures of the select signal generating part using a logic circuit and a structure of the selector according to an embodiment of the present invention. The select signal generating part includes a plurality of AND logic circuits 18-1 respectively supplied with the pattern detection flags PF#01–PF#16 corresponding to the 16 sampling phases. The AND logic circuits 18-1 have input terminals including inverting input terminals corresponding to the data of the pattern detection flags PF#01–PF#16. When the AND logic circuits 18-1 receive data having the respectively predetermined pattern detection flags, the AND logic circuits 18-1 output "1" through the respective output terminals.

The output signals of the AND logic circuits 18-1 are input to a selector 18-2, which combines the AND logic circuits 18-1 with OR logic circuits based on the output signals of the AND logic circuits 18-1. Hence, it is possible to select sampled data with the optimal phase from among the pieces of sampled data obtained by sampling with the different sampling phases in accordance with the output signals of the AND logic circuit 18-1 corresponding to the data information concerning the pattern detection flags for the 16 sampling phases.

Figure 24:
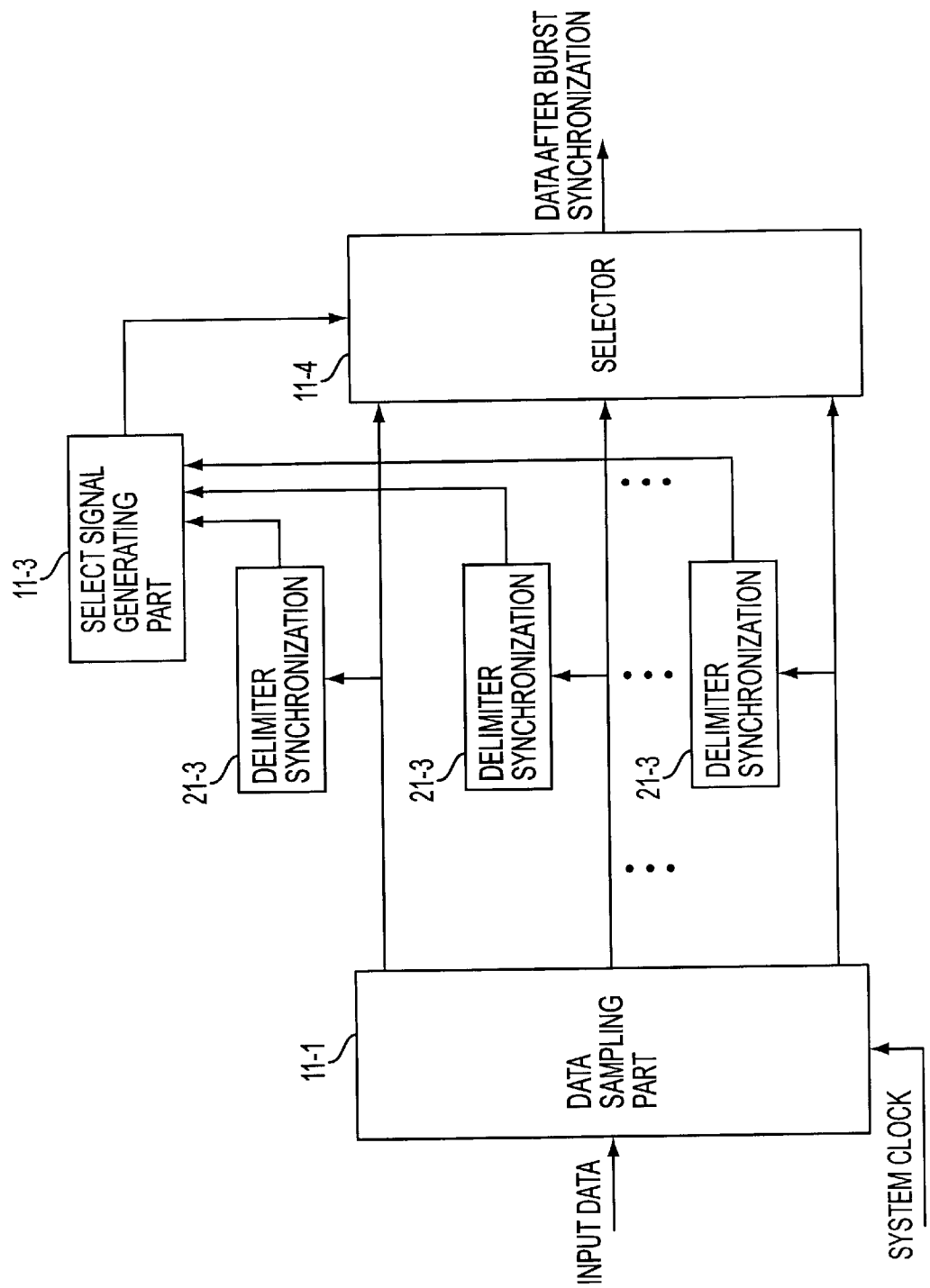
FIG. 24 is a diagram of a burst synchronizing circuit capable of simultaneously performing a delimiter synchronization.

FIG. 24 illustrates a structure of the burst synchronizing circuit capable of simultaneously performing the delimiter synchronization according to an embodiment of the present invention. The burst synchronizing circuit shown in FIG. 24 is obtained by replacing the delimiter detecting part 11-2 used in the burst synchronizing circuit shown in FIG. 16 by a delimiter synchronizing circuit 21-3.

Figure 1:
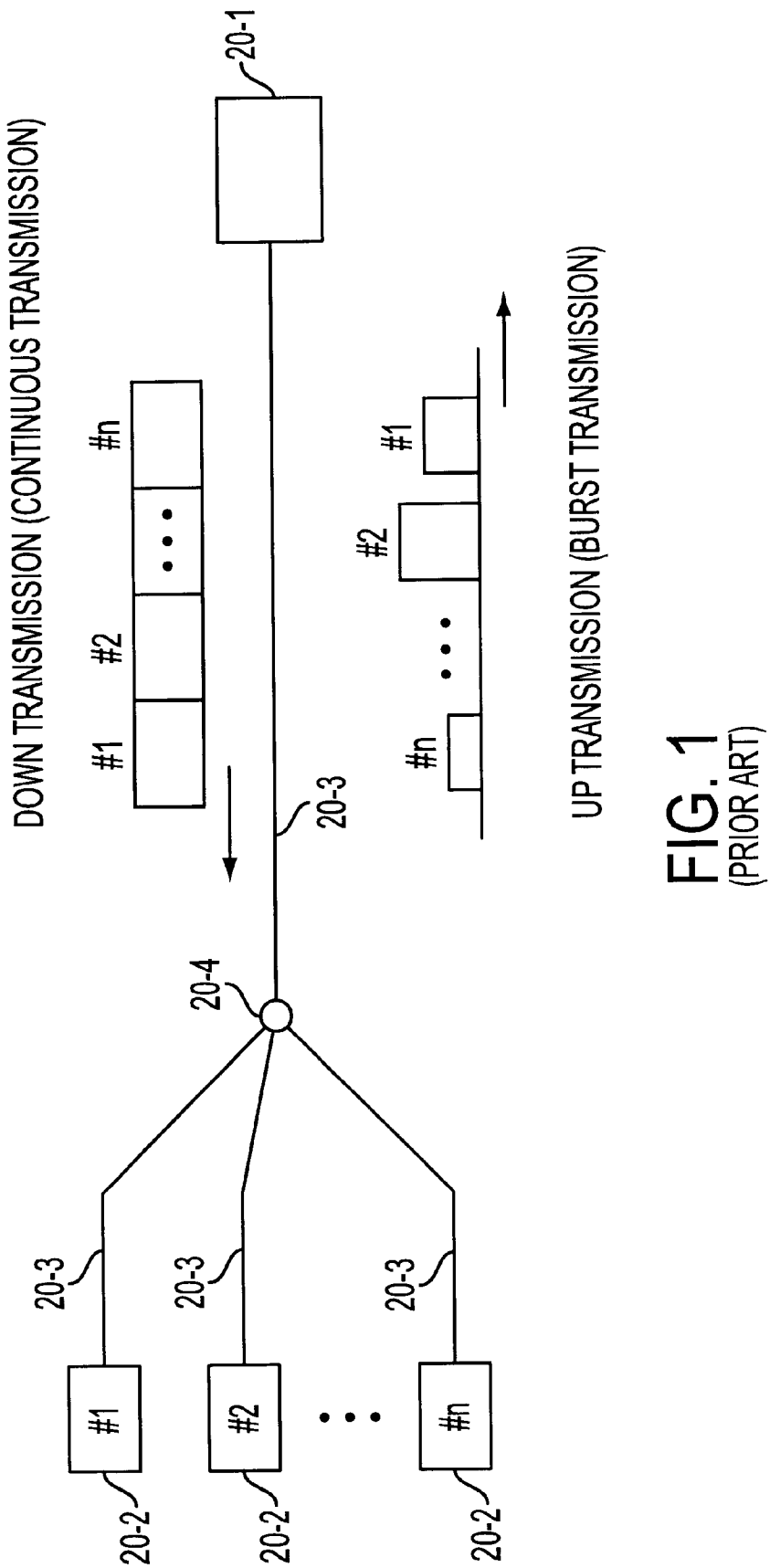
FIG. 1 is a block diagram of an optical subscriber transmission system which is an example of systems in which a data signal is transmitted in a burst fashion.
Figure 2:
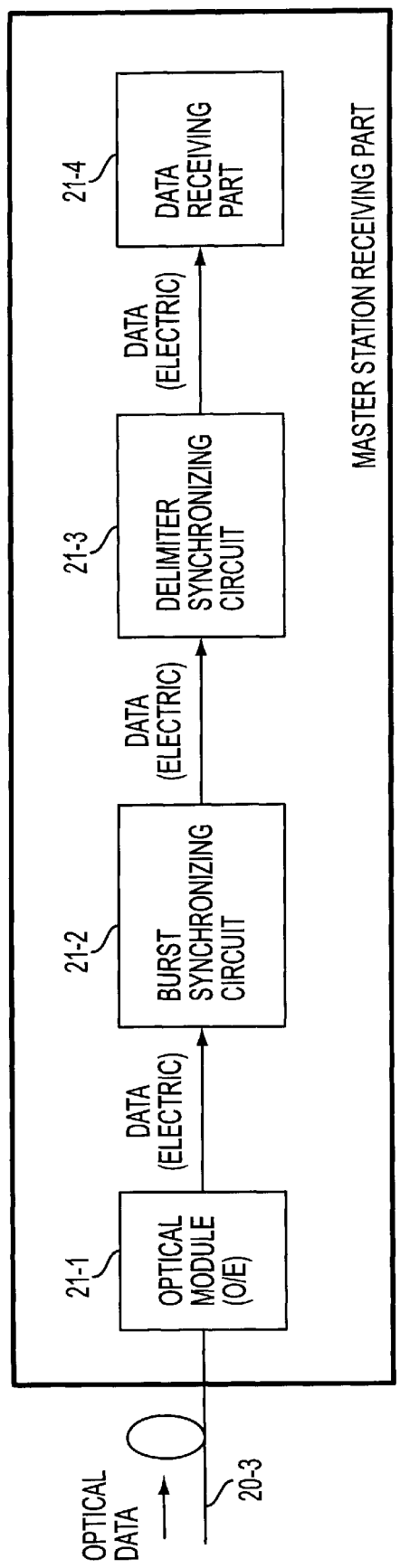
FIG. 2 is a block diagram of a burst signal receiving part of a master station shown in FIG. 1.
Figure 3:
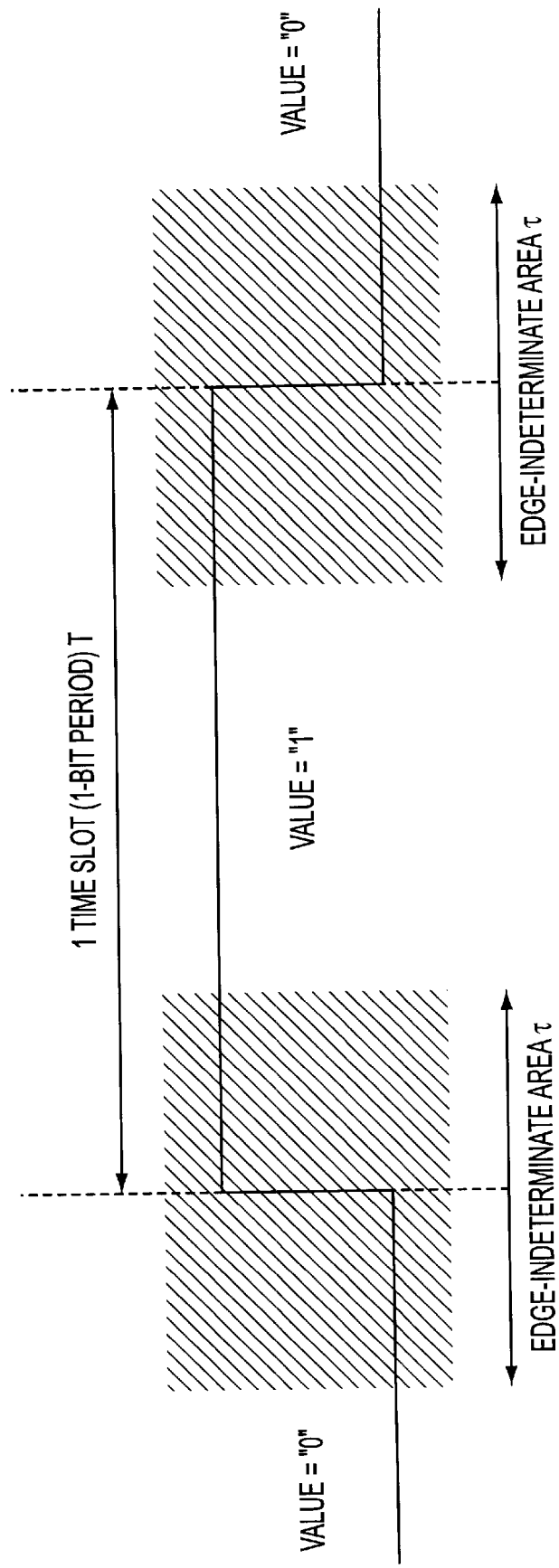
FIG. 3 is a waveform diagram of an output signal of an optical module shown in FIG. 2.
Figure 4:
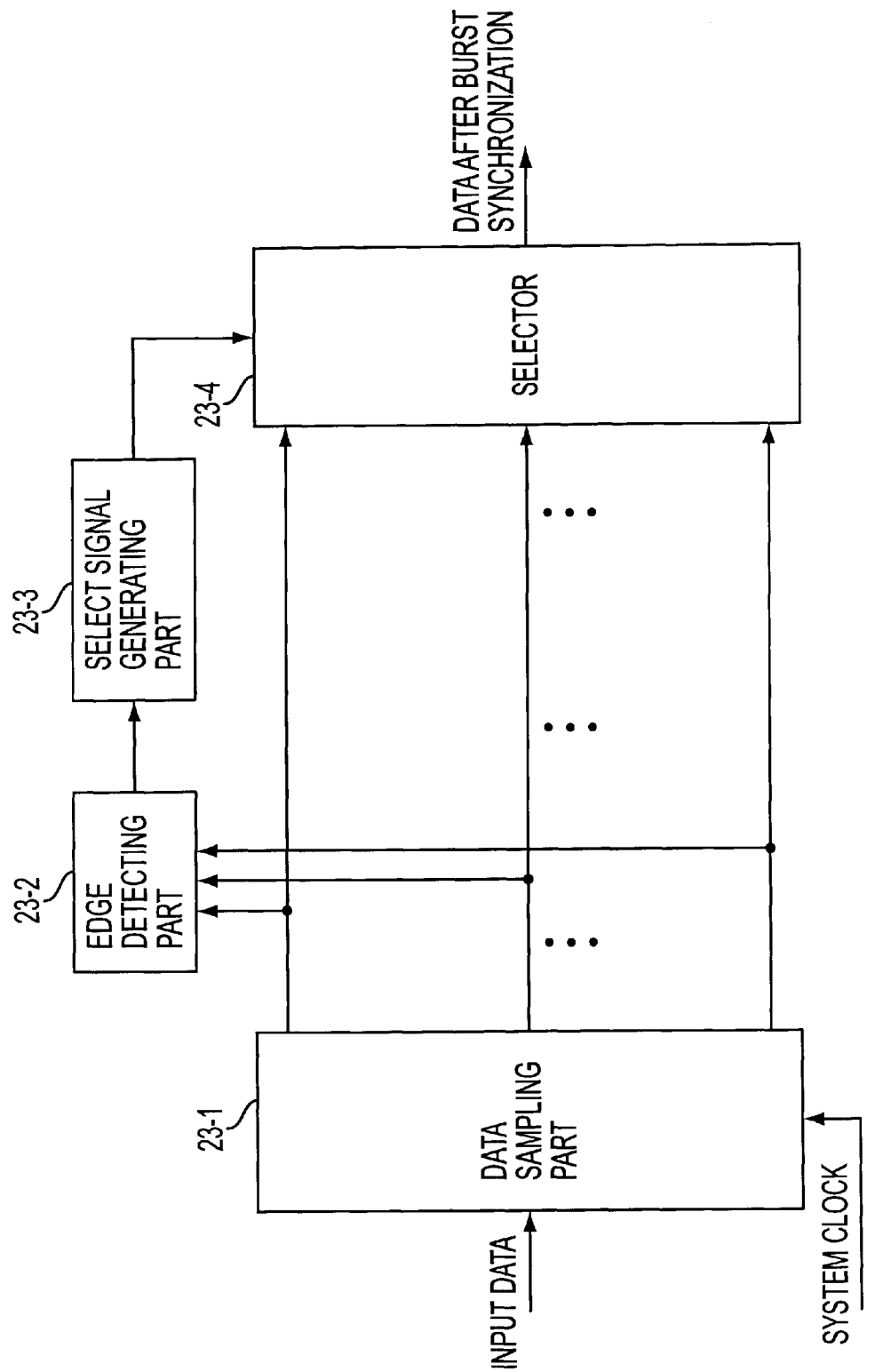
FIG. 4 is a block diagram of a conventional burst synchronizing circuit.
Figure 5:
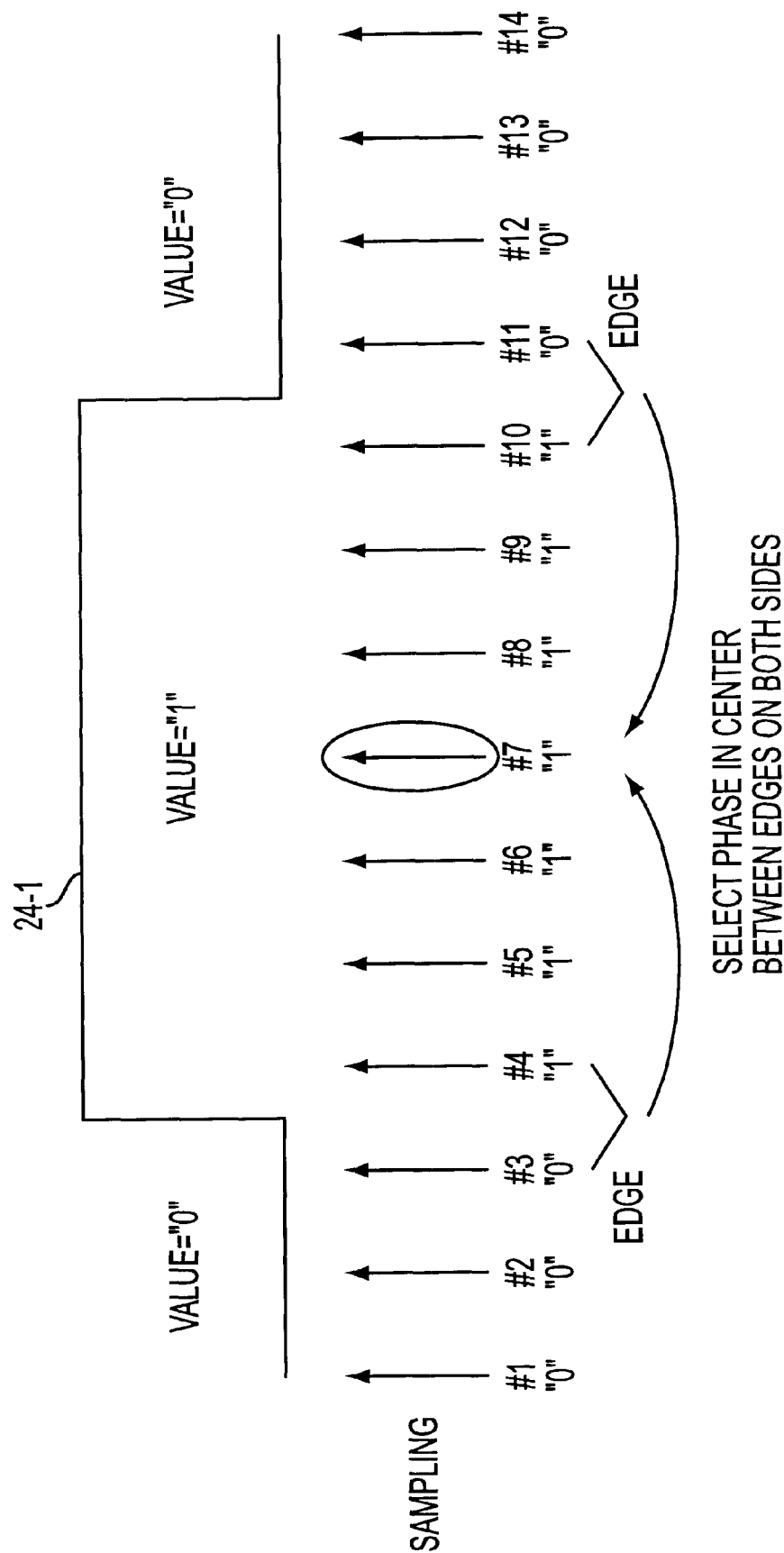
FIG. 5 is a diagram of an operation in which sampled data having the optimal phase is detected by a both-side edge detecting method.

As shown in FIG. 2, the general burst signal receiving part is configured so that the optical signal is converted into the electric signal by the optical module 21-1, and the bit phase of the electric signal is pulled in phase by the burst synchronizing circuit 21-2. Then, the byte-based synchronization (frame synchronization) is performed by the delimiter synchronizing circuit 21-3. Generally, the delimiter synchronizing circuit has the pattern detecting function and performs the pattern synchronization.

The burst synchronizing circuit according to the present invention carries out the pattern detection for every sampling phase. By carrying out the pattern detection by using the pattern detecting function of the delimiter synchronizing circuit 21-3, it is possible to integrate the bit-based burst synchronizing circuit and the byte-based delimiter synchronizing circuit with each other.

The above-mentioned structures of the burst synchronizing circuit are formed of hardware logic circuit configurations in order to follow up the high-speed performance (equal to, for example, 150 Mbps) in optical communication systems. However, for a system which is not required to have the high-speed performance, the functions of the data sampling parts, the pattern detecting parts and the select signal generating parts may be implemented by a program control using a CPU and a memory or a DSP (Digital Signal Processor).

The aforementioned embodiments of the present invention are applications to the optical subscriber systems. However, the burst synchronizing circuit of the present invention can be applied to the burst synchronizing circuits used in various communication systems using a metallic transmission path or radio communication channels (for example, a 1:1 terminal communication system or a mobile communication system).

The present invention is not limited to the specifically disclosed embodiments, and variations and modifications may be made without departing from the scope of the present invention.

What is claimed is:

1. A burst synchronizing circuit which synchronizes a received data signal in a burst fashion and sampling phases with which the received data signal is sampled, said burst synchronizing circuit comprising:

a first part which samples the received data signal with different sampling phases and detects a data pattern;

a second part which selects the received data signal sampled with an optimal sampling phase based on sampling phases with which the data pattern is detected;

wherein the first part comprises:

a data sampling part which sequentially delays the received data signal at an interval shorter than a one-bit period of the received data signal and samples delayed received data signal having different phases by a clock signal having the one-bit period, and a pattern detecting part which detects, from results of sampling the delayed received data signals, the data pattern included in the received data signal, and wherein the second part comprises:

a select signal generating part which generates a select signal for selecting, based on the results of detecting by the pattern detecting part, the received data signal sampled with a sampling phase located in the center of a section including the sampling phases with which the data pattern is detected.

2. A burst synchronizing circuit which synchronizes a received data signal in a burst fashion and sampling phases with which the received data signal is sampled, said burst synchronizing circuit comprising:

a first part which samples the received data signal with different sampling phases and detects a data pattern;

a second part which selects the received data signal sampled with an optimal sampling phase based on sampling phases with which the data pattern is detected;

wherein the first part comprises:

a data sampling part which sequentially delays a clock signal of a one-bit period for sampling the received data signal at an interval shorter than the one-bit period and samples the received data signal by resultant clock signals having different phases, and a pattern detecting part which detects, from results of sampling the received data signal by the clock signals having the different phases, the data pattern included in the received data signal, and wherein the second part comprises:

a select signal generating part which generates a select signal for selecting, based on the results of detecting by the pattern detecting part, the received data signal sampled with a sampling phase located in the center of a section including the sampling phases with which the data pattern is detected.

3. A burst synchronizing circuit which synchronizes a received data signal in a burst fashion and sampling phases with which the received data signal is sampled, said burst synchronizing circuit comprising:

a first part which samples the received data signal with different sampling phases and detects a data pattern;

a second part which selects the received data signal sampled with an optimal sampling phase based on sampling phases with which the data pattern is detected;

wherein the first part comprises:

a data sampling part which samples the received data signal by a clock signal having an interval shorter than a one-bit period and generates sampled data of the one-bit period having different sampling phases, and a pattern detecting part which detects, from results of sampling the received data signal with the different sampling phases of the clock signal, the data pattern included in the received data signal, and wherein the second part comprises:

a select signal generating part which generates a select signal for selecting, based on the results of detecting by the pattern detecting part, the received data signal sampled with a sampling phase located in the center of a section including the sampling phases with which the data pattern is detected.

4. A burst synchronizing circuit which synchronizes a received data signal in a burst fashion and sampling phases with which the received data signal is sampled, said burst synchronizing circuit comprising:

a first part which samples the received data signal with different sampling phases and detects a data pattern;

a second part which selects the received data signal sampled with an optimal sampling phase based on sampling phases with which the data pattern is detected;

wherein the first part comprises:

a data sampling part which sequentially samples the received data signal by a multi-phase clock signal having a phase difference shorter than a one-bit period and generates sampled data of the one-bit period having different sampling phases, and a pattern detecting part which detects, from results of sampling the received data signals, the data pattern included in the received data signal, and wherein the second part comprises:

a select signal generating part which generates a select signal for selecting, based on the results of detecting by the pattern detecting part, the received data signal sampled with a sampling phase located in the center of a section including the sampling phases with which the data pattern is detected.

5. The burst synchronizing circuit as claimed in claim 1, wherein the pattern detecting part comprises a circuit which compares sampled data obtained by sampling the data pattern with pattern data stored in a memory and outputs a pattern detection flag signal based on comparison results.

6. The burst synchronizing circuit as claimed in claim 1, wherein the pattern detecting part includes an AND logic circuit which outputs a pattern detection flag signal by performing an AND operation on the results of sampling.

7. The burst synchronizing circuit as claimed in claim 1, wherein the pattern detecting part includes a plurality of AND logic circuits which output pattern detection flag signals by performing AND operations on the results of sampling including a bit error having a predetermined number of erroneous bits.

8. The burst synchronizing circuit as claimed in claim 1, wherein the pattern detecting part has a configuration which detects the data pattern by an operation using sampled data obtained previously and thus outputs pattern detection flags.

9. The burst synchronizing circuit as claimed in claim 1, wherein the select signal generating part includes a memory which stores the select signal for each data pattern of pattern detection flag signals obtained for each of the sampling phases.

10. The burst synchronizing circuit as claimed in claim 1, wherein the select signal generating part includes a logic circuit which outputs the select signal for each data pattern of pattern detection flag signals obtained for each of the sampling phases.

11. The burst synchronizing circuit as claimed in claim 1, wherein the pattern detecting part simultaneously performs a byte-based pattern synchronization.

* * * * *